US012659614B2

(12) United States Patent
Seo et al.

(10) Patent No.: US 12,659,614 B2
(45) Date of Patent: Jun. 16, 2026

(54) IMAGE SENSOR INCLUDING DARK CURRENT REMOVAL

(71) Applicant: Samsung Electronics Co., Ltd., Suwon-si (KR)

(72) Inventors: Haneol Seo, Suwon-si (KR); Kyung-Min Kim, Suwon-si (KR); Minjong Kim, Suwon-si (KR); Minwoo Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 265 days.

(21) Appl. No.: 18/526,343

(22) Filed: Dec. 1, 2023

(65) Prior Publication Data

US 2024/0397221 A1 Nov. 28, 2024

(30) Foreign Application Priority Data

May 25, 2023 (KR) ........................ 10-2023-0067958

(51) Int. Cl.
| | |
|---|---|
| *H04N 25/633* | (2023.01) |
| *H04N 25/703* | (2023.01) |
| *H04N 25/77* | (2023.01) |
| *H04N 25/78* | (2023.01) |

(52) U.S. Cl.
CPC ......... *H04N 25/633* (2023.01); *H04N 25/703* (2023.01); *H04N 25/77* (2023.01); *H04N 25/78* (2023.01)

(58) Field of Classification Search
CPC .... H04N 25/633; H04N 25/63; H04N 25/703; H04N 25/77; H04N 25/78
See application file for complete search history.

(56) References Cited

U.S. PATENT DOCUMENTS

| | | | |
|---|---|---|---|
| 7,969,487 B2 | 6/2011 | Matsuda | |
| 8,508,629 B2 | 8/2013 | Mo et al. | |
| 8,520,101 B2 | 8/2013 | Meng et al. | |
| 9,118,854 B2 | 8/2015 | Iwasaki et al. | |
| 9,369,645 B2 * | 6/2016 | Hsu | H04N 25/633 |
| 2003/0202111 A1 * | 10/2003 | Park | H04N 25/616 |
| | | | 348/229.1 |
| 2015/0116533 A1 * | 4/2015 | Hsu | H04N 25/633 |
| | | | 348/223.1 |
| 2022/0077113 A1 | 3/2022 | Ong et al. | |

FOREIGN PATENT DOCUMENTS

| | | |
|---|---|---|
| CN | 101931737 A | 12/2010 |
| CN | 110784668 A | 2/2020 |
| KR | 10-1471467 B1 | 12/2014 |
| KR | 10-2011945 B1 | 8/2019 |

* cited by examiner

*Primary Examiner* — Nicholas G Giles
(74) *Attorney, Agent, or Firm* — Harness, Dickey & Pierce, P.L.C.

(57) ABSTRACT

An image sensor includes a pixel array including active pixels and optical black (OB) pixels; a comparator having a first input terminal at which a pixel signal of the pixel array is applied, and a second input terminal to which a ramp signal is applied; a digital-to-analog converter (DAC) that generates an OB voltage based on dark current data obtained by reading out pixel signals of the OB pixels; and a dark current removal circuit that applies a compensation voltage corresponding to the OB voltage to at least one of the first input terminal and the second input terminal during a readout period of an active pixel.

19 Claims, 26 Drawing Sheets

8192
(13bit)

| | INP | INN |
|----|-----|-----|
| RT | · · · · · | — · — |
| HT | – – – – | —— |

TG

SW1

SW2

SW3

INP
INN

ⓑ

ⓐ

ⓑ

ⓒ

OUT

Counter

FIG. 14C

IMAGE SENSOR INCLUDING DARK CURRENT REMOVAL

CROSS-REFERENCE TO RELATED APPLICATION(S)

This application claims benefit of priority to Korean Patent Application No. 10-2023-0067958, filed on May 25, 2023, in the Korean Intellectual Property Office, the disclosure of which is incorporated herein by reference in its entirety.

BACKGROUND

The present disclosure relates to image sensors and methods of operating the same.

Each pixel of an image sensor includes a photoelectric transformation element, such as a photodiode, and peripheral circuits. The image sensor may process a pixel signal, generated in each pixel, to generate image data.

For example, the pixel signal includes a dark current component generated even when light is absent due to various causes, as well as a photocurrent component generated by light received by a photoelectric transformation element. Such a dark current component acts as noise during generation of image data, and thus needs to be removed.

To remove a dark current component, dark current data may be obtained using optical black (OB) pixels shielded from light, and then subtracted from a pixel value through a digital operation.

However, when an image sensor is exposed to a high-temperature environment and a dark current component reaches a predetermined level or more, a dynamic range within which a pixel signal is read out is reduced, which imposes limitations on removing the dark current component.

SUMMARY

Example embodiments provide an image sensor which may efficiently remove a dark current component, and a method of operating the same.

Embodiment of the inventive concepts provide an image sensor that includes a pixel array including active pixels and optical black (OB) pixels; a comparator having a first input terminal at which a pixel signal of the pixel array is applied, and a second input terminal at which a ramp signal is applied; a digital-to-analog converter (DAC) that generates an OB voltage based on dark current data obtained by reading out pixel signals of the OB pixels; and a dark current removal circuit that applies a compensation voltage corresponding to the OB voltage to at least one of the first input terminal and the second input terminal during a readout period of an active pixel from among the active pixels.

The dark current removal circuit may include a plurality of switches; a first capacitor having one end at which the pixel signal is applied, and another end connected to the first input terminal; a second capacitor having one end at which the ramp signal is applied, and another end connected to the second input terminal; a third capacitor that applies the compensation voltage to the first input terminal based on operation of the plurality of switches; and a fourth capacitor that applies the compensation voltage to the second input terminal based on operation of the plurality of switches.

The compensation voltage, applied to the input terminal through the third capacitor, may be a first compensation voltage increased by a magnitude of the OB voltage, and the compensation voltage, applied to the second input terminal through the fourth capacitor, may be a second compensation voltage decreased by the magnitude of the OB voltage.

The plurality of switches may include a first switch having one end connected to a ground voltage and another end connected to the third capacitor; a second switch having one end connected to the OB voltage and another end connected to the third capacitor; a third switch having one end connected to the ground voltage and another end connected to the fourth capacitor; and a fourth switch having one end connected to the OB voltage and another end having the fourth capacitor.

The first compensation voltage may be generated by turning off the first switch and turning on the second switch, and the second compensation voltage may be generated by turning on the third switch and turning off the fourth switch.

The dark current removal circuit may apply the first compensation voltage to the first input terminal and apply a ground voltage to the fourth capacitor during the readout period of the active pixel.

A voltage at the second input terminal may vary with a predetermined slope depending on the ramp signal after the first compensation voltage is applied to the first input terminal.

The dark current removal circuit may apply the second compensation voltage to the second input terminal and apply a ground voltage to the third capacitor during the readout period of the active pixel.

A voltage at the second input terminal may vary with a predetermined slope depending on the ramp signal after the second compensation voltage is applied to the second input terminal.

The dark current removal circuit may apply the first compensation voltage to the first input terminal and apply the second compensation voltage to the second input terminal during the readout period of the active pixel.

A voltage at the second input terminal may vary with a predetermined slope depending on the ramp signal after the first and second compensation voltages are applied to the first and second input terminals, respectively.

The plurality of switches may include a fifth switch that connects the first capacitor and the third capacitor in parallel when the fifth switch is turned on, and a sixth switch that connects the second capacitor and the fourth capacitor in parallel when the sixth switch is turned on.

The dark current removal circuit may operate in either one of a first mode in which the fifth and sixth switches are turned on, and a second mode in which the fifth and sixth switches are turned off, and to apply a voltage corresponding to the OB voltage to at least one of the first input terminal and the second input terminal while operating in the second mode.

The dark current removal circuit may apply the pixel signal to the first input terminal through the first and third capacitors connected in parallel and apply the ramp signal to the second input terminal through the second and fourth capacitors connected in parallel while operating in the first mode.

The image sensor may include a switch controller that controls turn-on and turn-off operations of the fifth and sixth switches based on temperature of the image sensor or the dark current data. The switch controller may turn off the fifth and sixth switches when the temperature of the image sensor is higher than or equal to a predetermined temperature or when the dark current data is greater than or equal to a predetermined value.

Capacitance of each of the first and second capacitors may have a first value, capacitance of each of the third and fourth capacitors may have a second value, and the first value may be equal to the second value or greater than the second value.

The DAC may generate a first OB voltage based on the dark current data when the first value is equal to the second value, and generate a second OB voltage, higher than the first OB voltage, based on the dark current data when the first value is greater than the second value.

The pixel array may be read out in an order of the OB pixels and the active pixels during a single frame time, and the dark current data may be a representative value of OB pixel values based on a result of reading out the OB pixels.

Embodiments of the inventive concepts further provide an image sensor that includes a pixel array including active pixels receiving light and optical black (OB) pixels shielded from light; a plurality of comparators provided for each column of the pixel array and that compares respective pixel signals of the pixel array with a ramp signal to output comparison signals; a plurality of counters respectively provided for each column of the pixel array and that outputs respective count values based on the comparison signals; an image signal processor (ISP) that generates dark current data using count values based on pixel signals of the OB pixels; a digital-to-analog converter (DAC) that generates an OB voltage corresponding to the dark current data; and a dark current removal circuit provided for each column of the pixel array and that reflects the OB voltage in at least one of the pixel signals of the active pixels input to the comparators and the ramp signal.

Embodiments of the inventive concepts still further provide a method of operating an image sensor including active pixels receiving light and optical black (OB) pixels shielded from light. The method includes obtaining dark current data by reading out pixel signals of the OB pixels; generating an analog voltage corresponding to the dark current data; and removing a noise component, caused by dark current, from pixel signals of the active pixels using the analog voltage. The image sensor may include a comparator having a first input terminal at which a pixel signal is applied, and a second input terminal at which a ramp signal is applied. The removing of the noise component may include reflecting the analog voltage in at least one of the first input terminal and the second input terminal during a readout period of an active pixel.

BRIEF DESCRIPTION OF DRAWINGS

The above and other aspects, features, and advantages of the present disclosure will be more clearly understood from the following detailed description, taken in conjunction with the accompanying drawings.

FIG. 2B is a timing diagram of the image sensor of FIG. 1A in a high-temperature environment.

FIG. 3A is a diagram illustrating a ramp signal waveform of a single-slope analog-to-digital converter (ADC).

FIG. 3B is a diagram illustrating a ramp signal waveform of a single-slope ADC.

4

Figure 5:
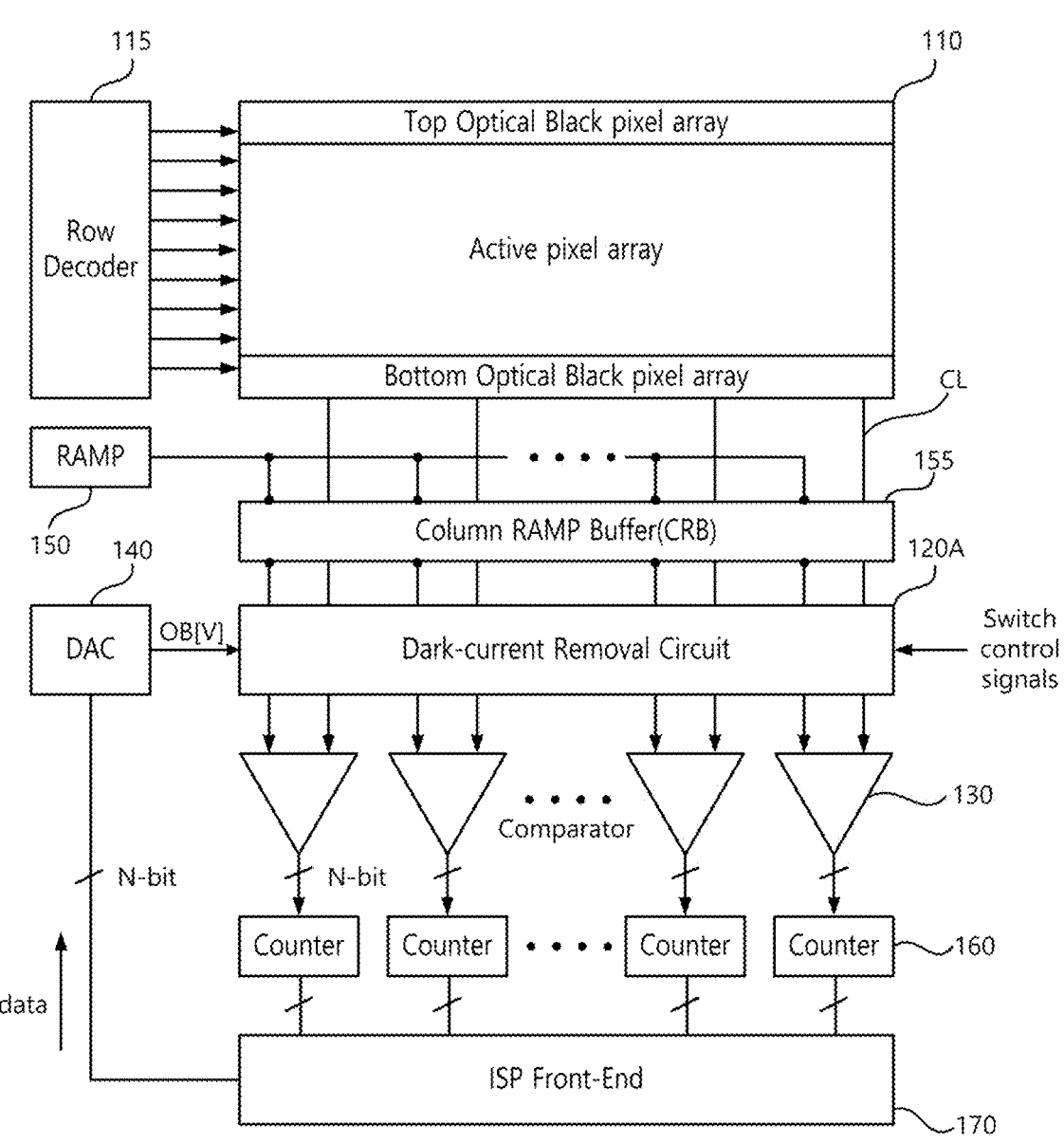

FIG. 5 is a block diagram of an image sensor according to example embodiments.

Figure 6:
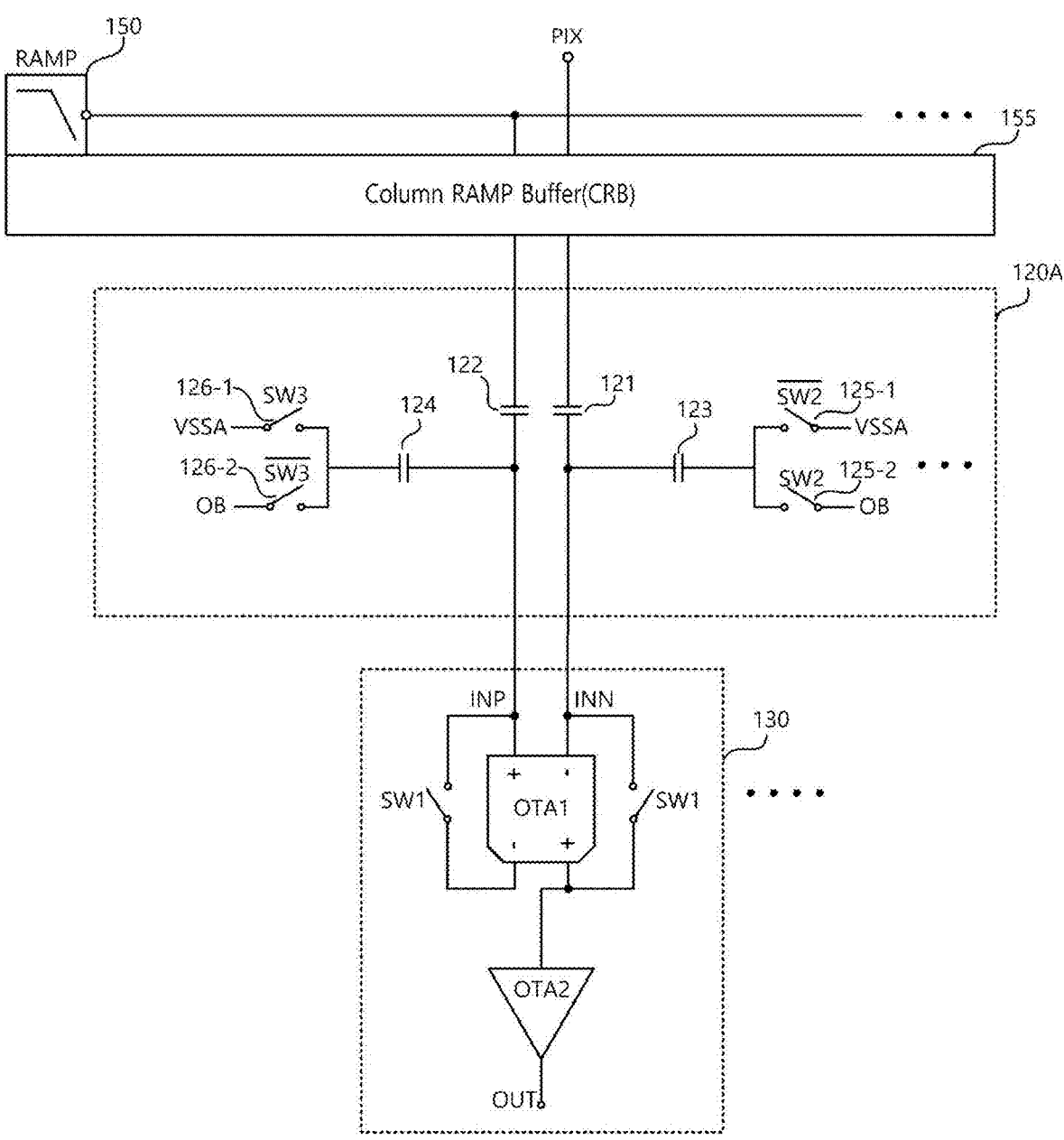

FIG. 6 is a diagram illustrating a detailed configuration of a dark current removal circuit according to example embodiments.

Figure 7A:
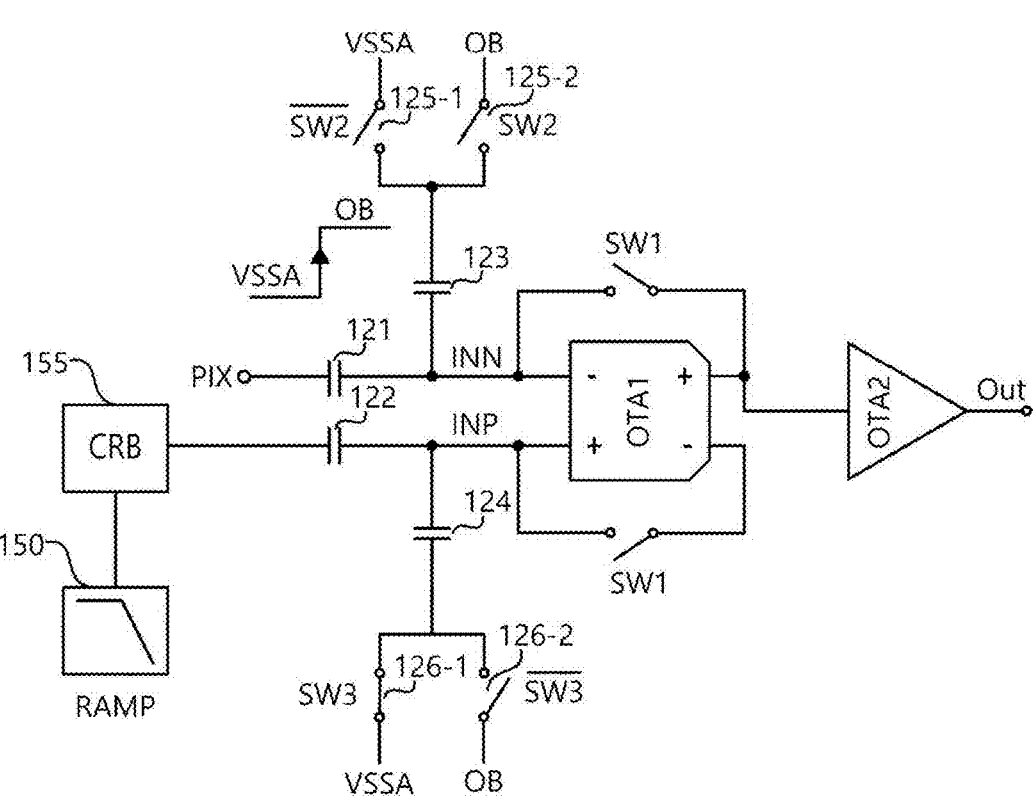

FIG. 7A is a circuit diagram illustrating operation of a dark current removal circuit according to example embodiments.

Figure 7B:
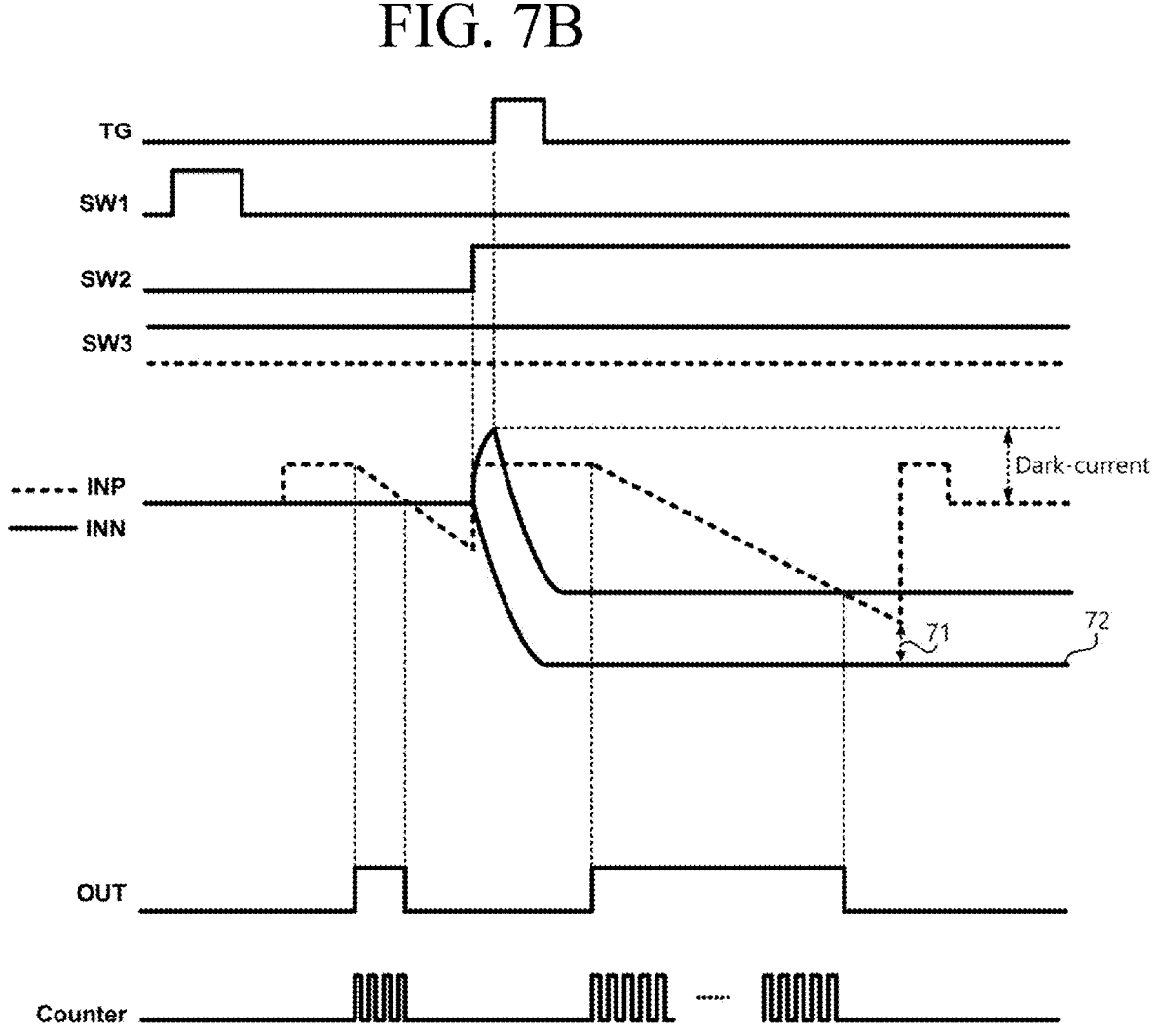

FIG. 7B is a timing diagram illustrating operation of an image sensor associated with dark current removal circuit of FIG. 7A.

Figure 8A:
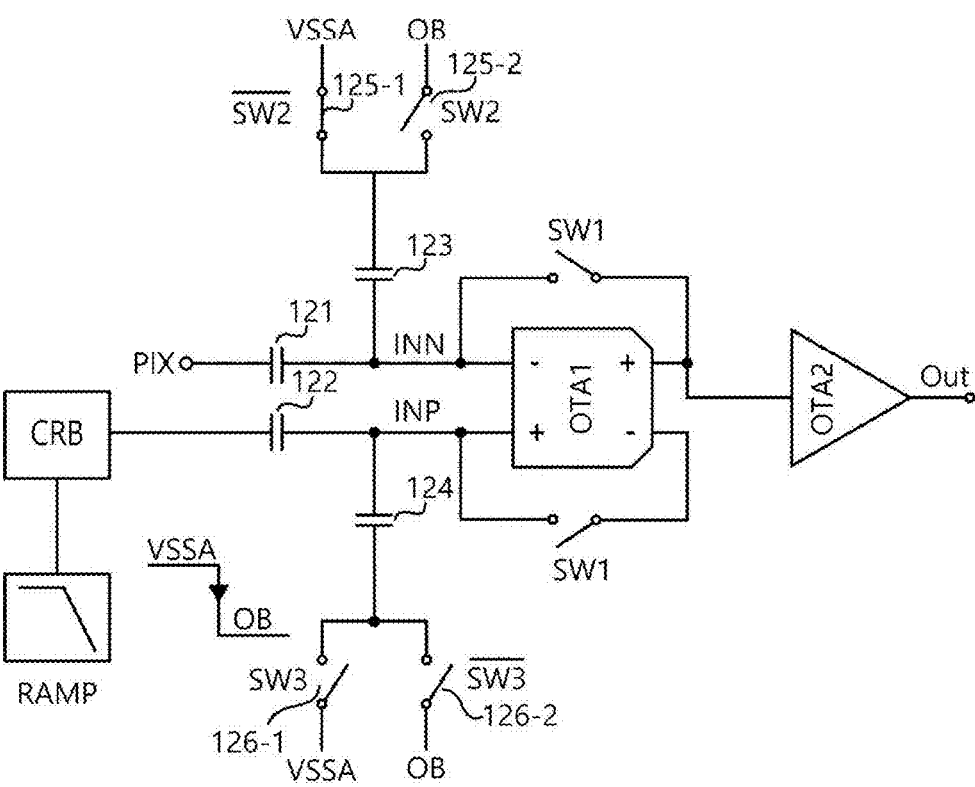

FIG. 8A is a circuit diagram illustrating operation of a dark current removal circuit according to example embodiments.

Figure 8B:
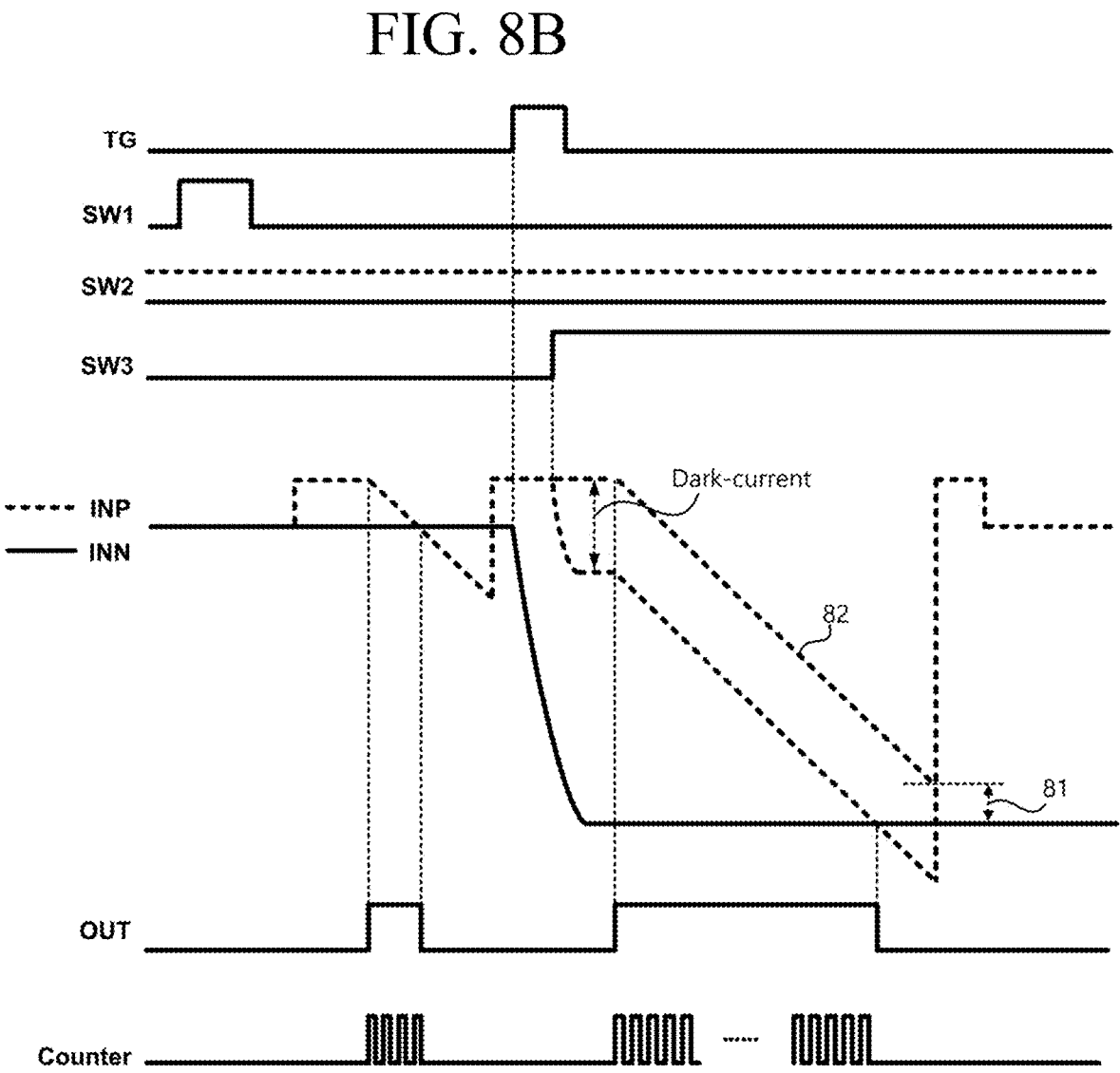

FIG. 8B is a timing diagram illustrating operation of an image sensor associated with the dark current removal circuit of FIG. 8A.

Figure 9A:
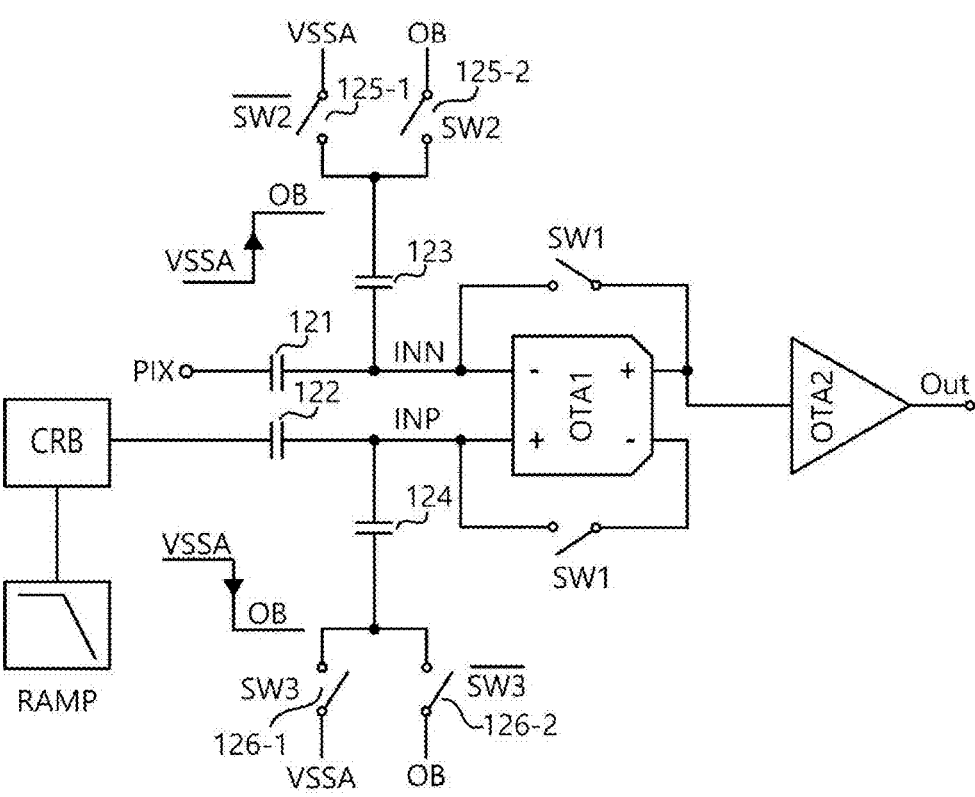

FIG. 9A is a circuit diagram illustrating operation of a dark current removal circuit according to example embodiments.

Figure 9B:
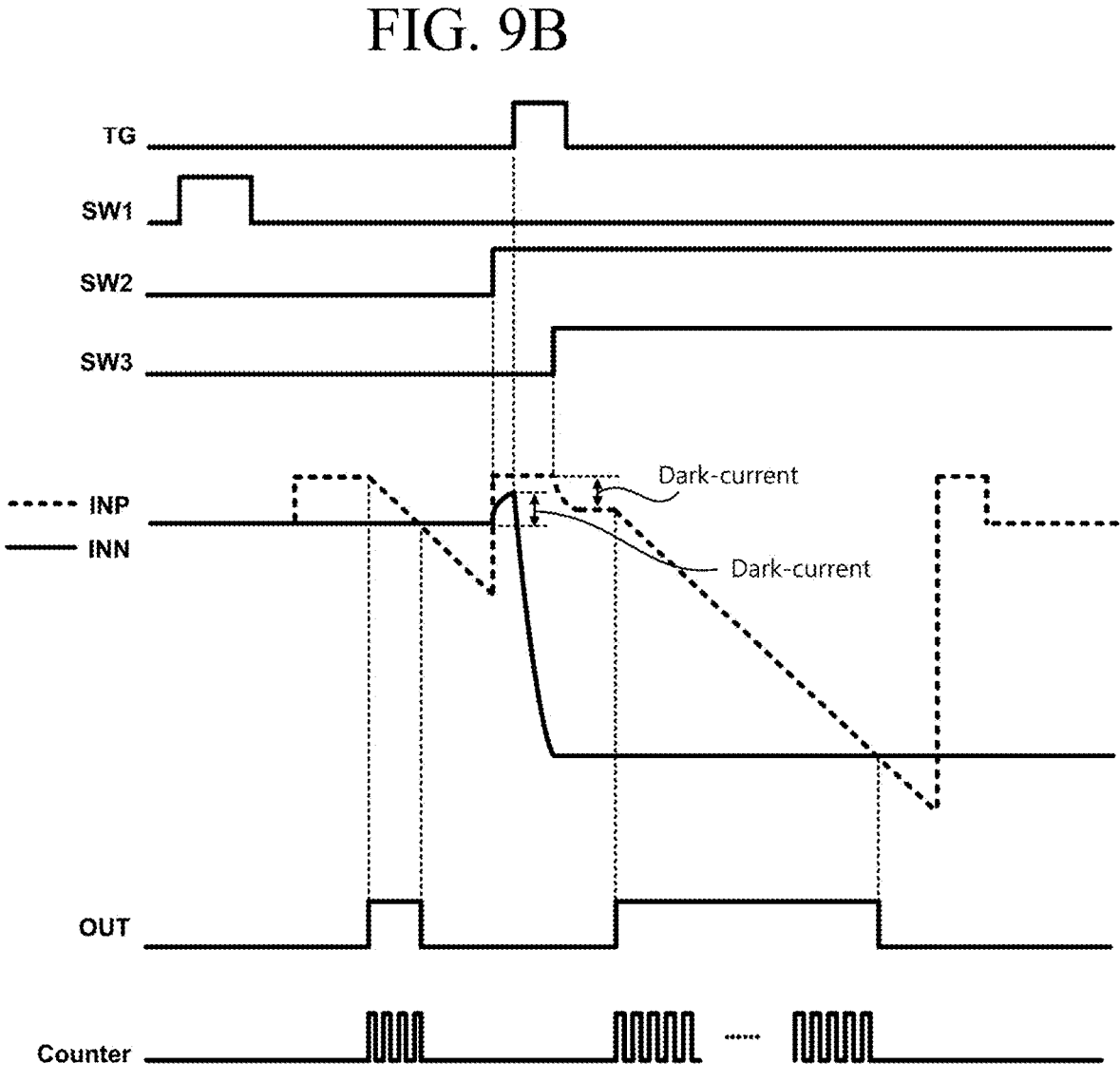

FIG. 9B is a timing diagram illustrating operation of an image sensor associated with the dark current removal circuit of FIG. 9A.

Figure 10:
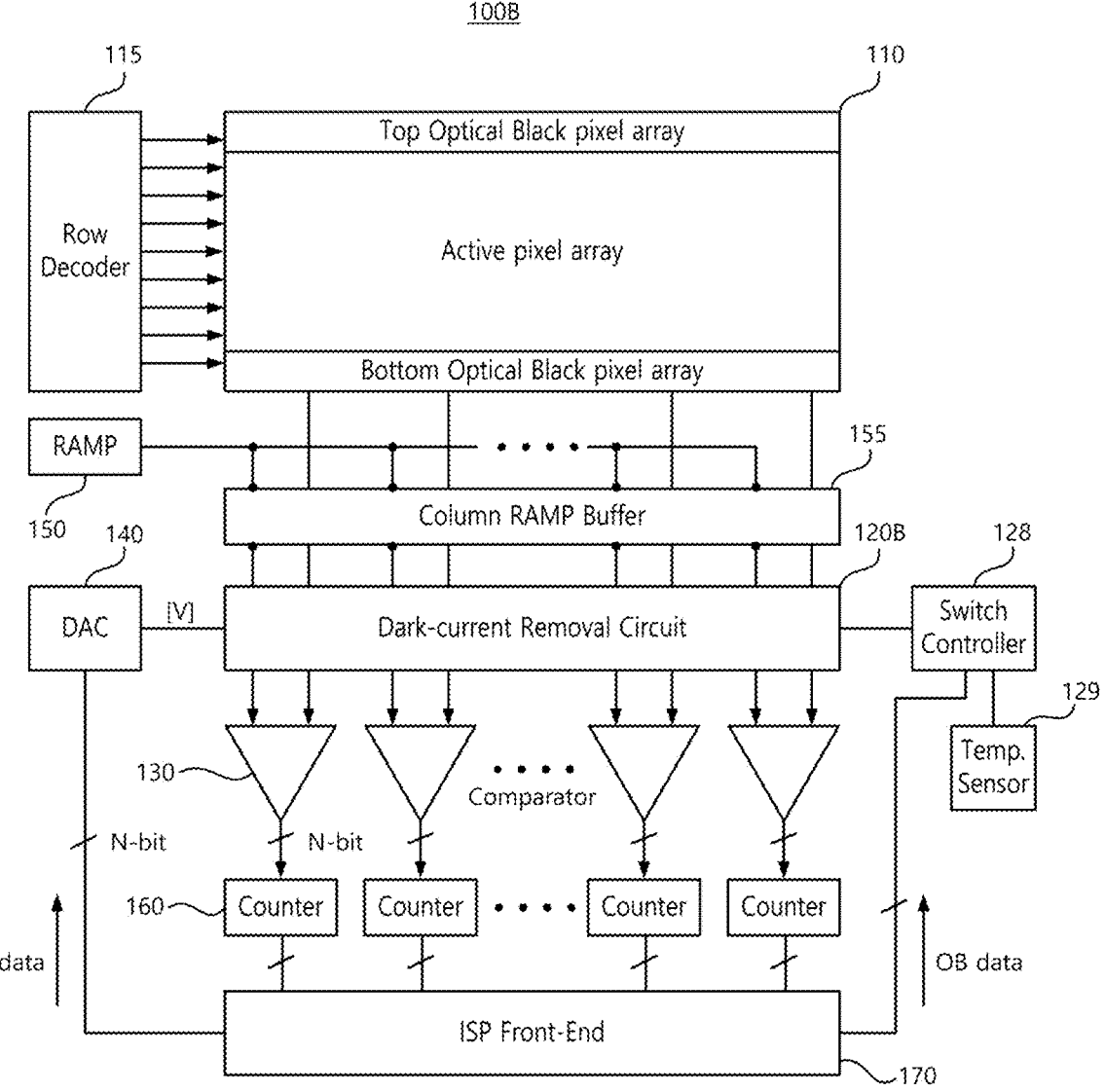

FIG. 10 is a block diagram of an image sensor according to example embodiments.

Figure 11:
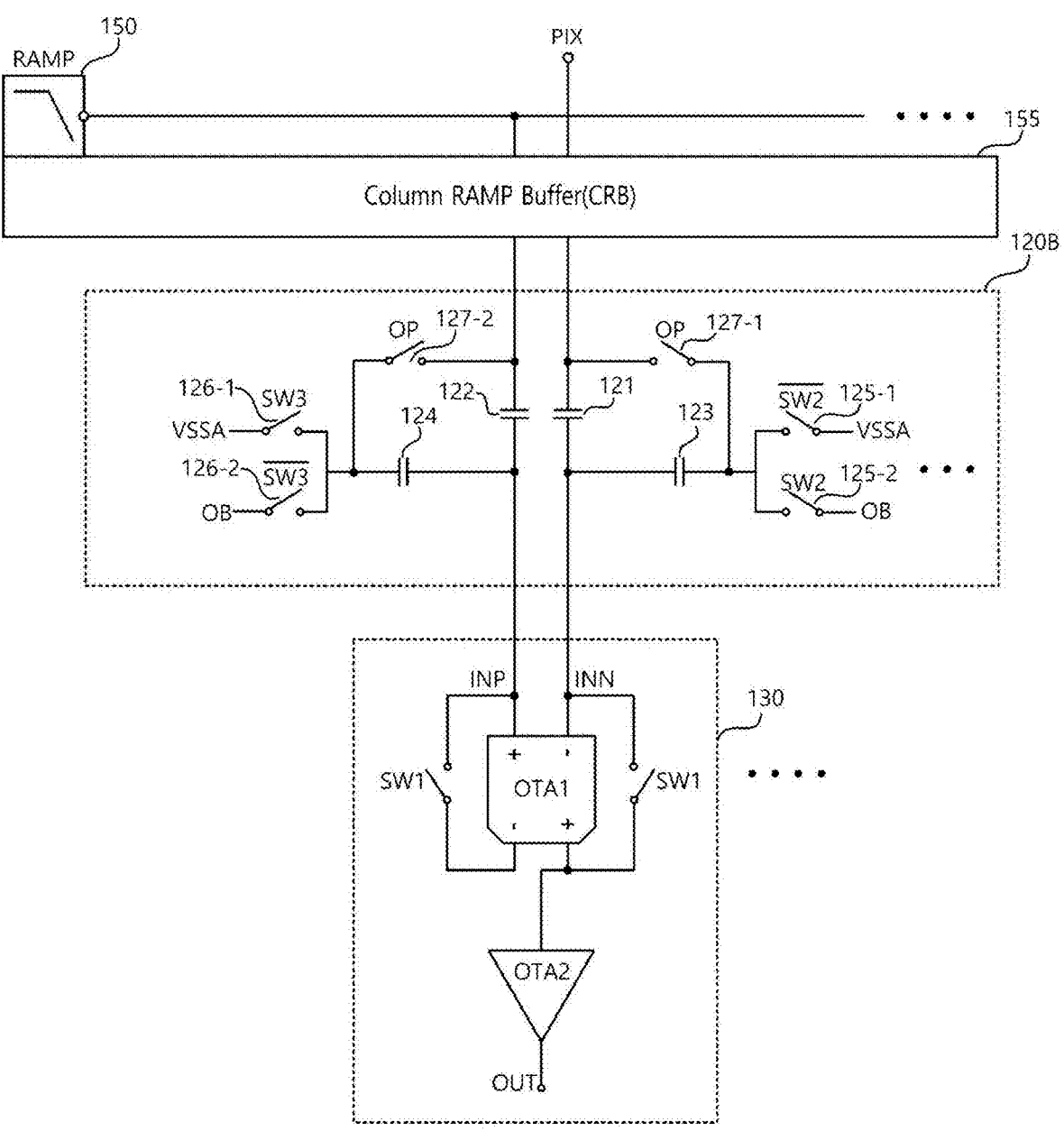

FIG. 11 is a diagram illustrating a detailed configuration of a dark current removal circuit according to example embodiments.

Figure 12:
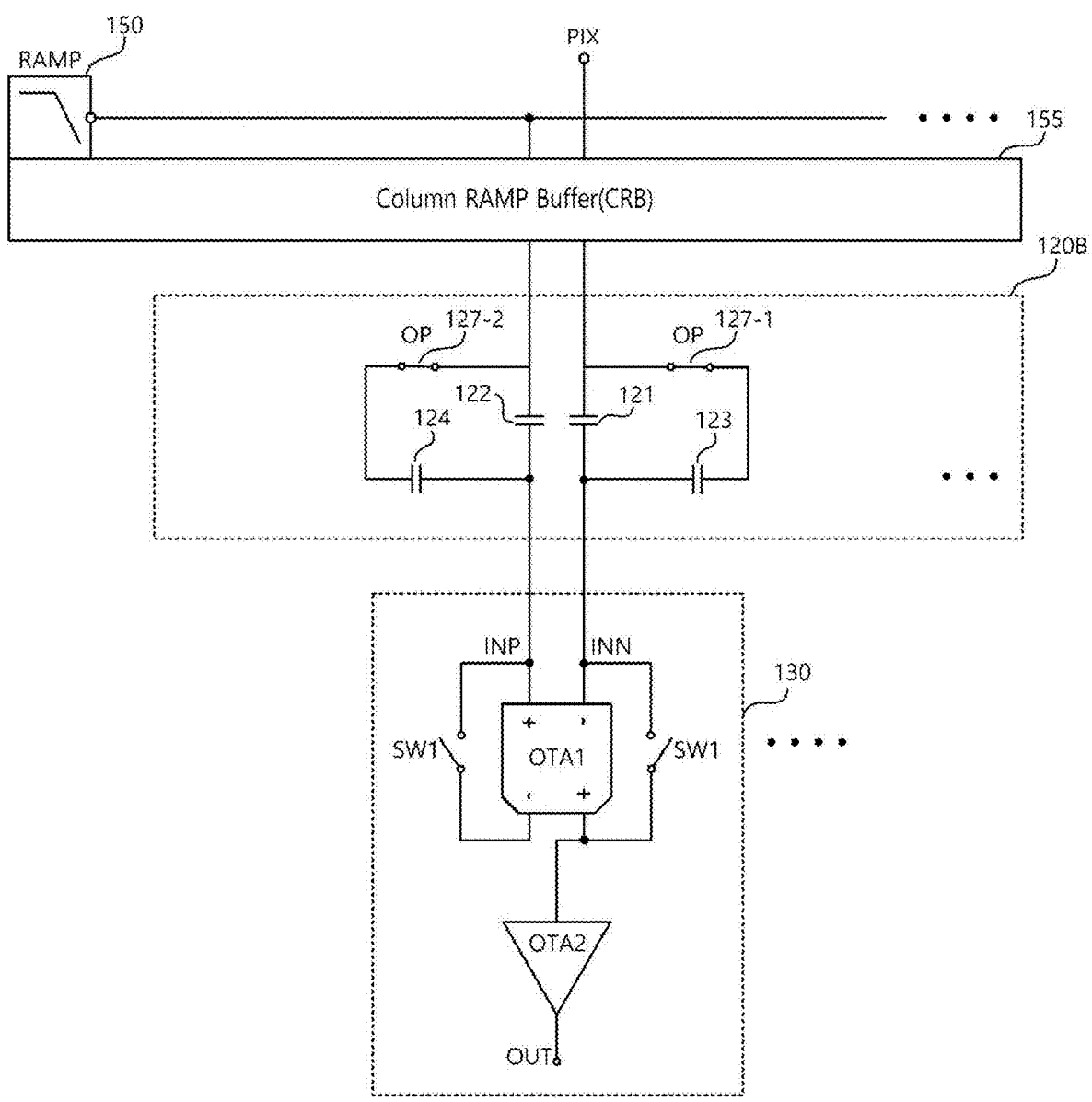

FIG. 12 is a diagram illustrating operation of a dark current removal circuit according to example embodiments in a room-temperature mode.

Figure 13:
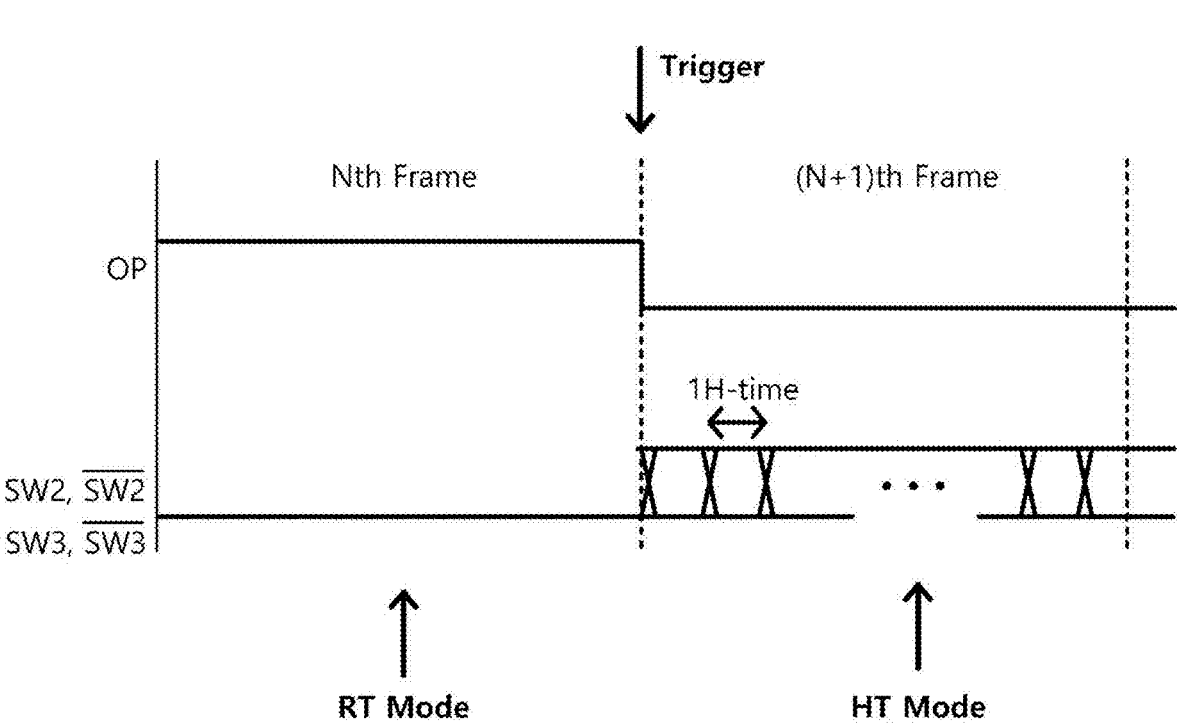

FIG. 13 is a diagram illustrating example embodiments associated with a mode change operation of an image sensor.

Figure 14A:
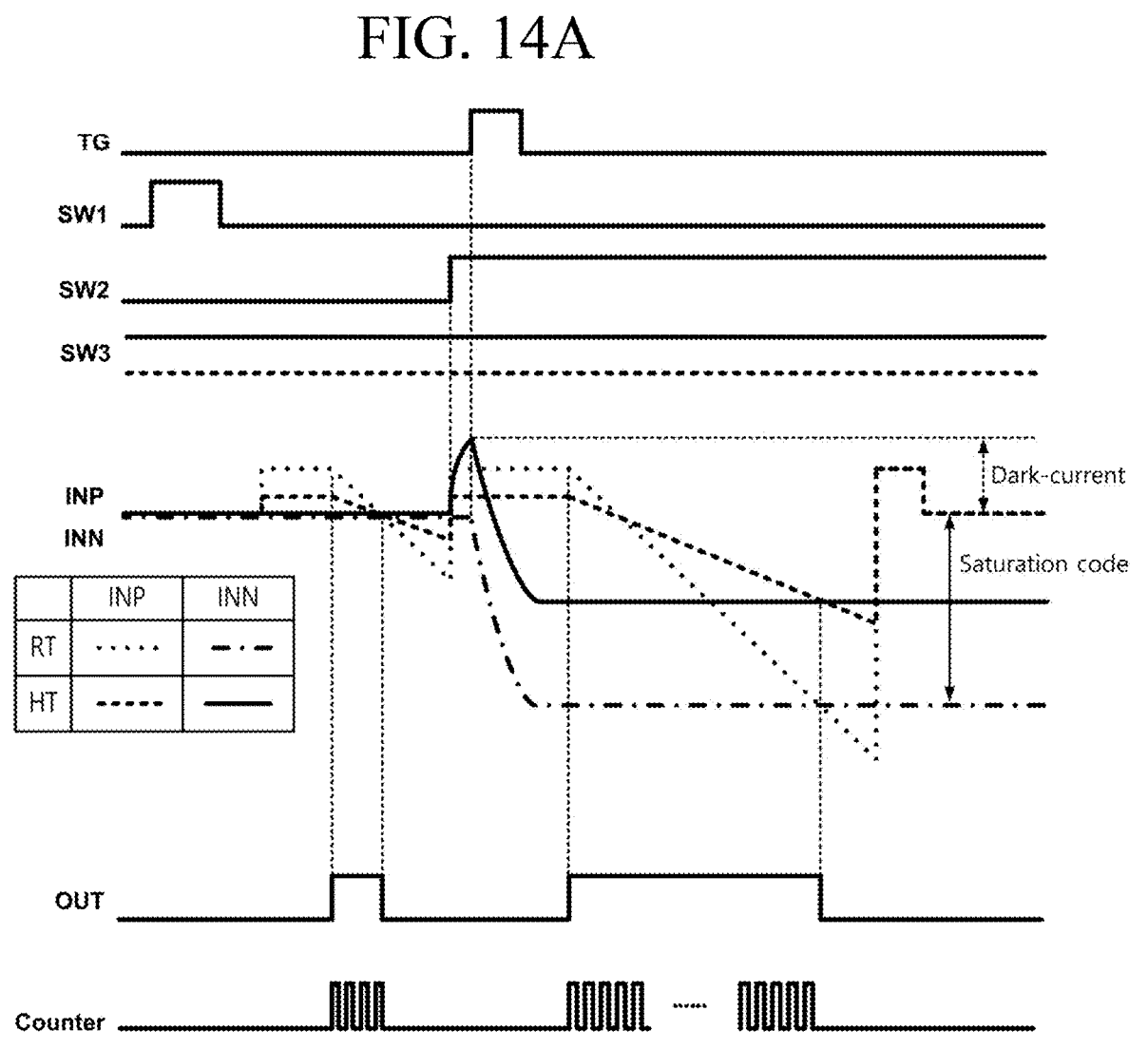

FIG. 14A is a timing diagram illustrating operation of an image sensor according to example embodiments.

Figure 14B:
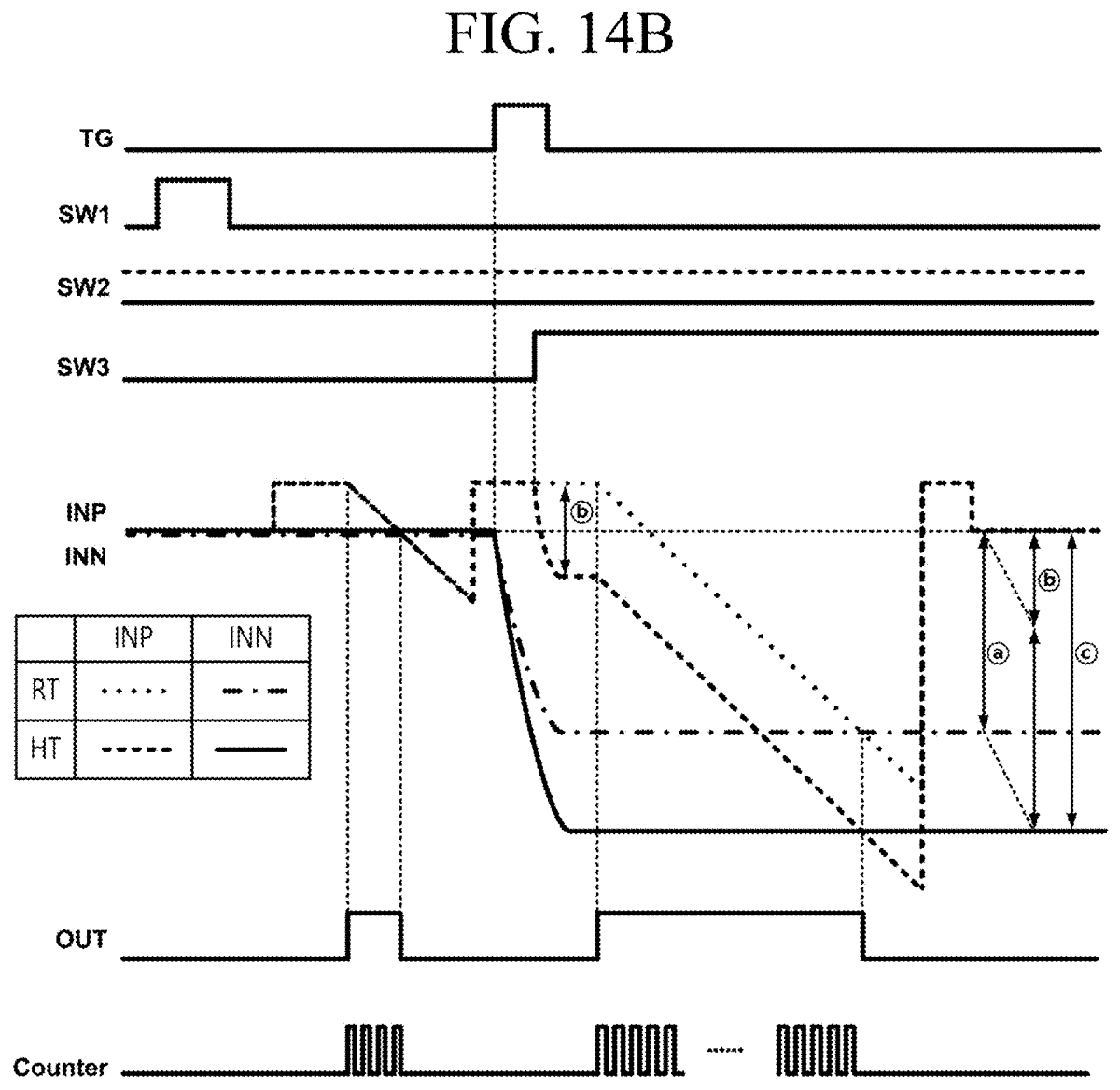

FIG. 14B is a timing diagram illustrating operation of an image sensor according to example embodiments.

Figure 14C:
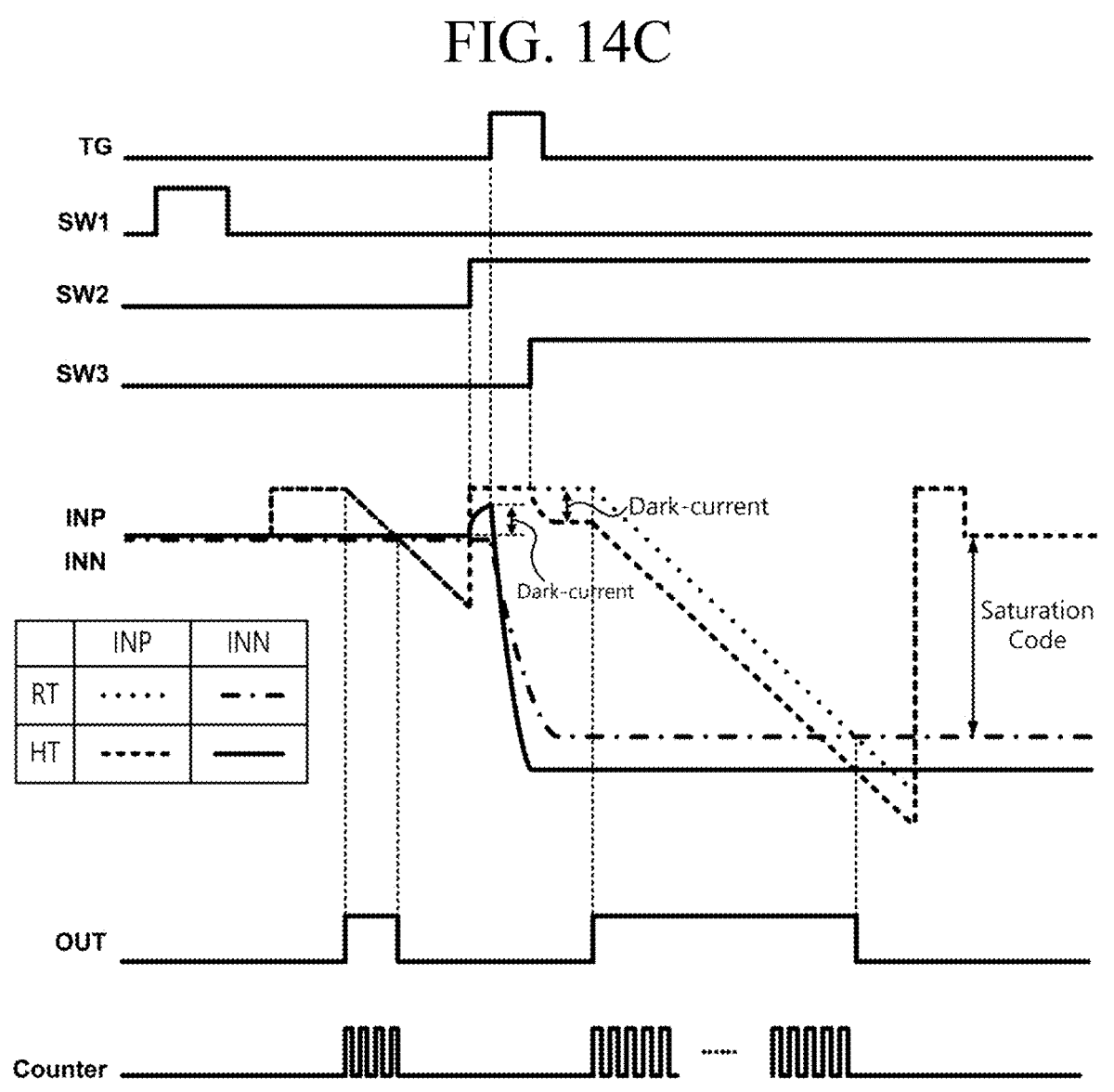

FIG. 14C is a timing diagram illustrating operation of an image sensor according to example embodiments.

Figure 15A:
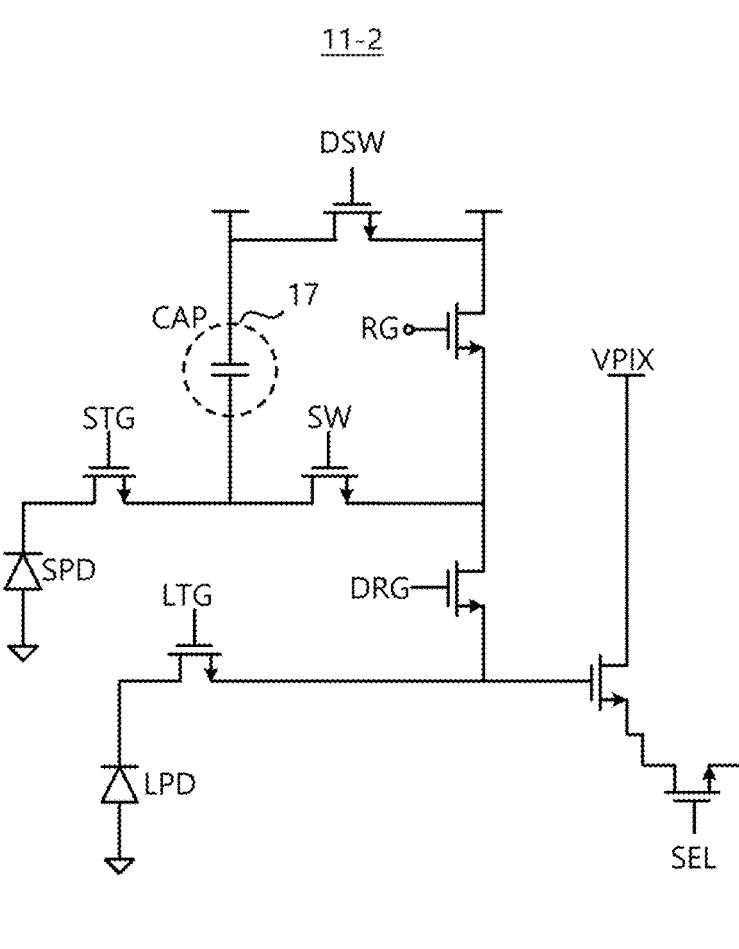

FIG. 15A is a diagram illustrating a pixel structure having a split photodiode structure according to example embodiments.

Figure 15B:
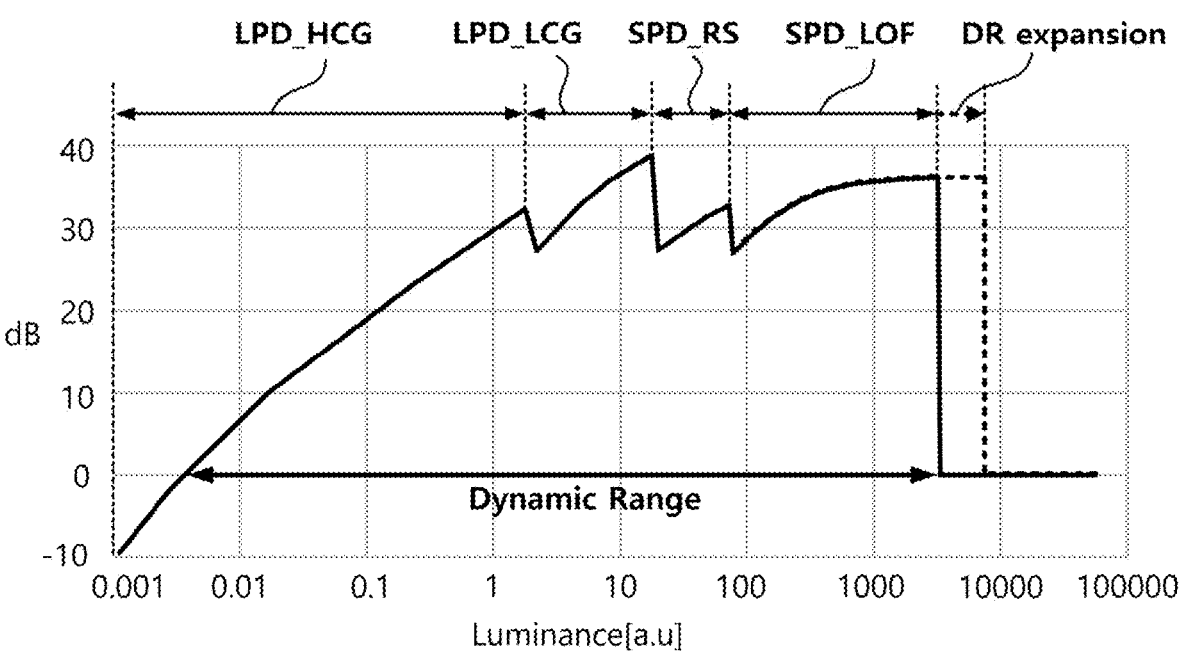

FIG. 15B is a diagram illustrating operation modes of image sensor including pixels having a split photodiode structure.

Figure 15C:
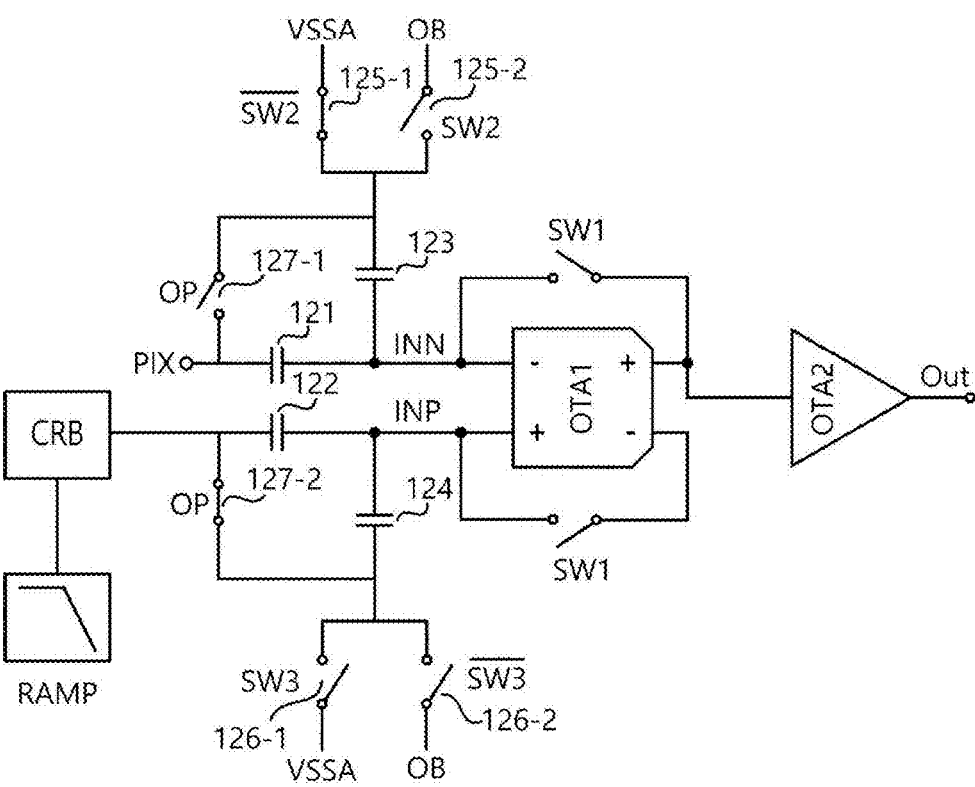

FIG. 15C is a circuit diagram illustrating operation of an image sensor according to example embodiments.

Figure 16:
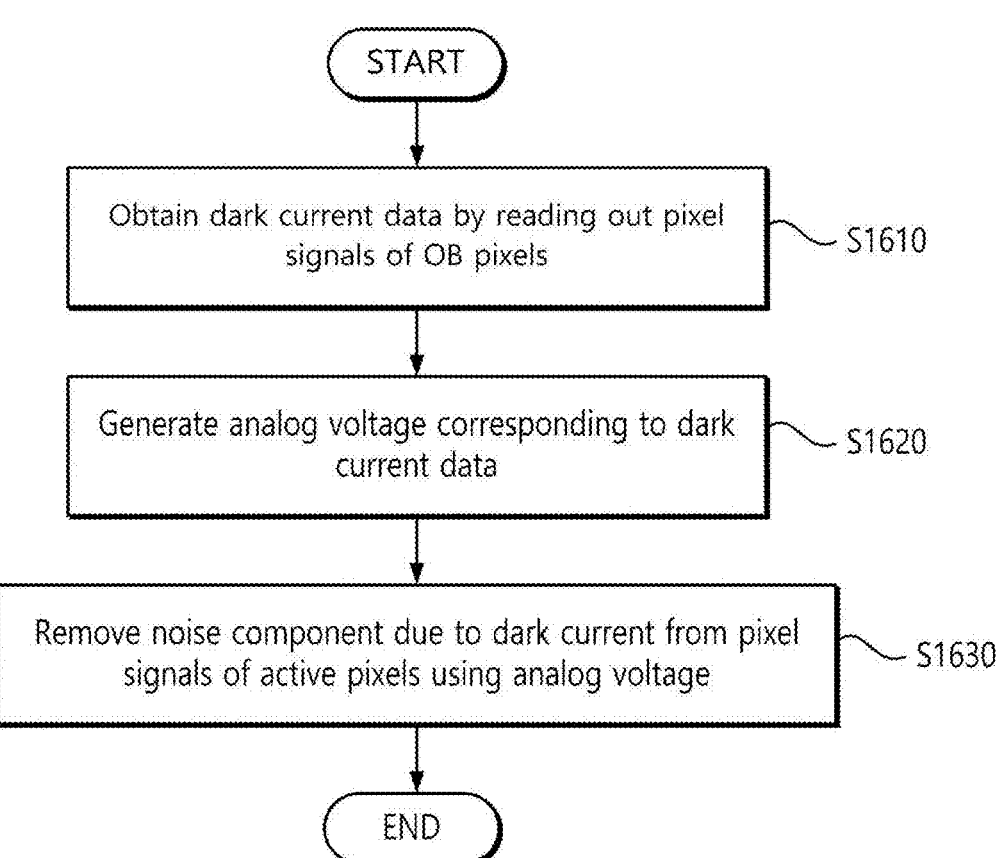

FIG. 16 is a flowchart illustrating a method of operating an image sensor according to example embodiments.

DETAILED DESCRIPTION

Hereinafter, example embodiments will be described with reference to the accompanying drawings.

As used throughout this disclosure, for example, "at least one of A, B, and C" and similar language (e.g., "at least one selected from the group consisting of A, B, and C") may be construed as A only, B only, C only, or any combination of two or more of A, B, and C, such as, for instance, ABC, AB, BC, and AC.

Figure 1A:
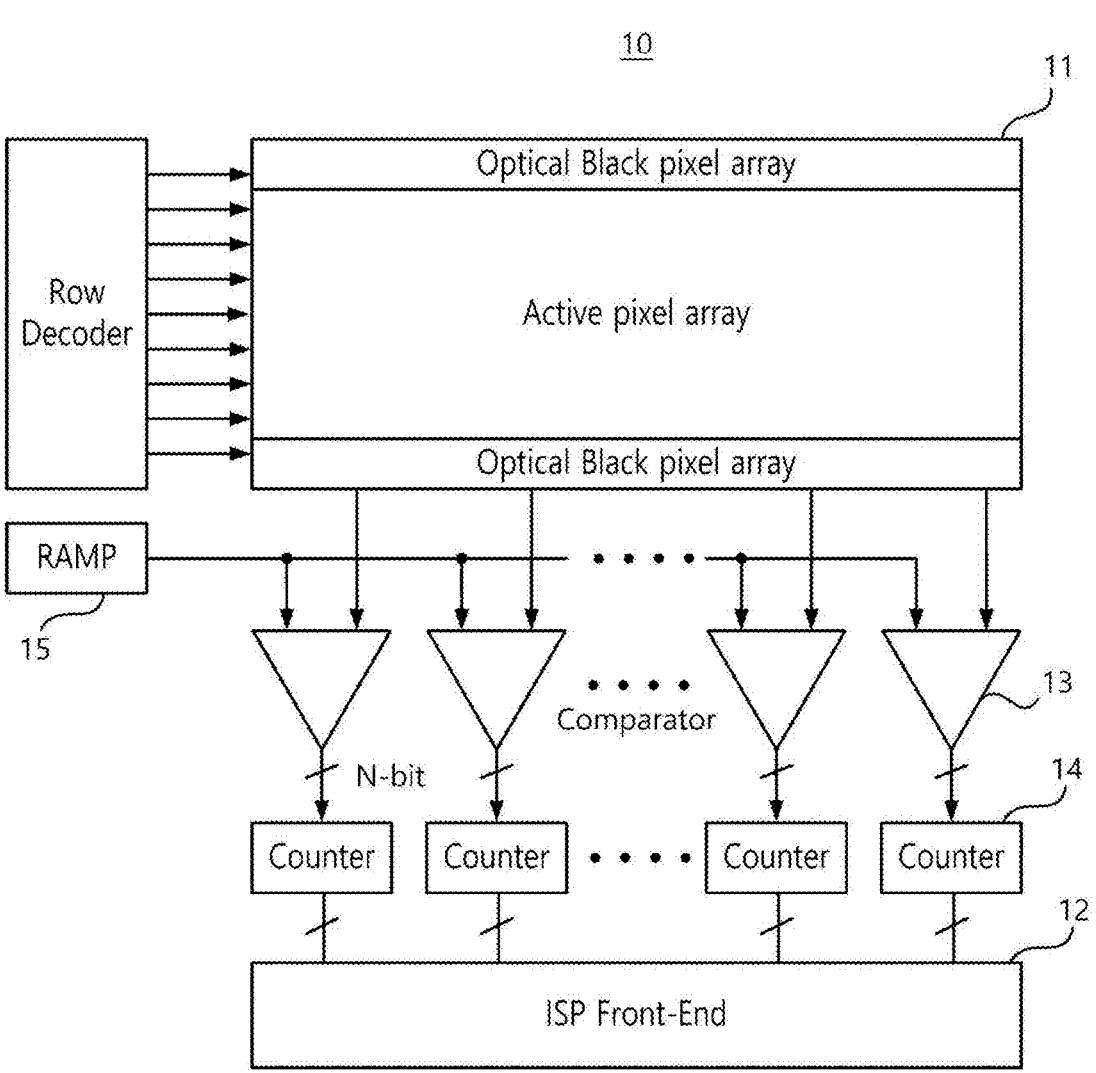
FIG. 1A is a block diagram illustrating a configuration of an image sensor according to example embodiments.
Figure 1B:
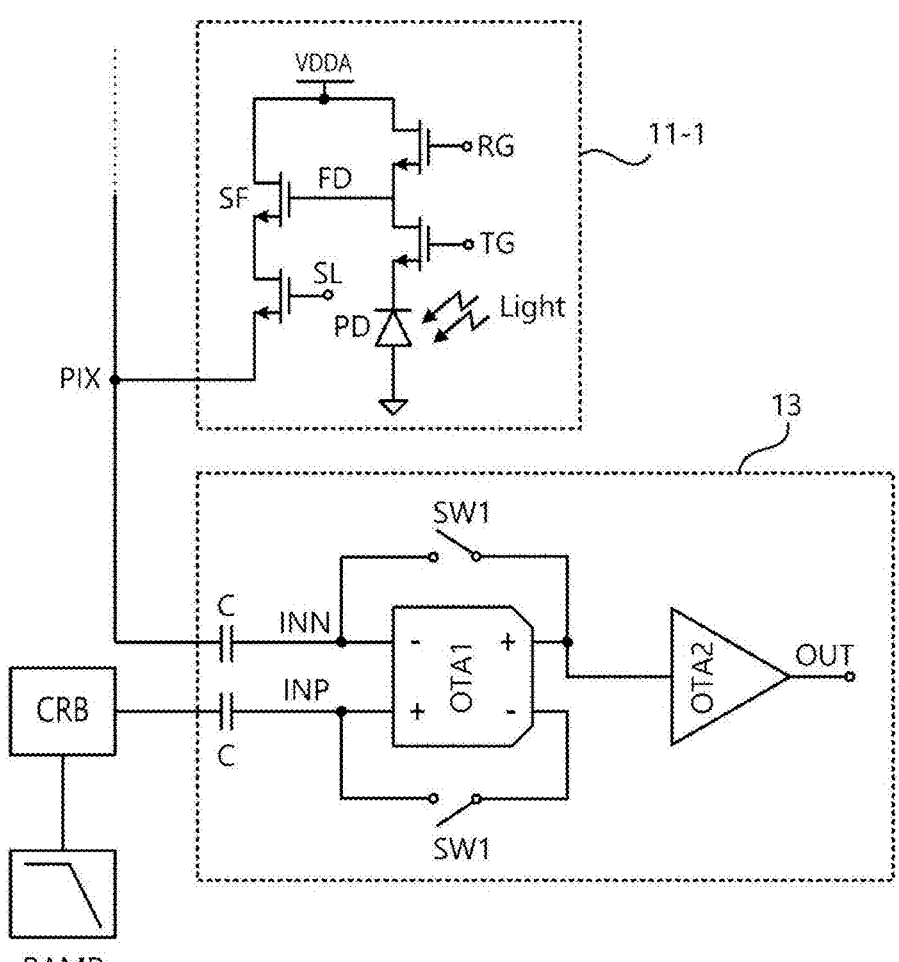
FIG. 1B is a diagram illustrating a configuration associated with an active pixel included in the image sensor of FIG. 1A.

FIG. 1A is a block diagram illustrating a configuration of an image sensor according to example embodiments, and FIG. 1B is a diagram illustrating an configuration of a single active pixel 11-1 included in the image sensor 10 of FIG. 1A and a comparator 13 connected to the single active pixel 11-1.

Referring to FIG. 1A, an image sensor 10 may include a pixel array 11, a ramp signal generator 15, a comparator 13, a counter 14, and an image signal processor (ISP) front-end 12.

The pixel array 11 may include an active pixel array, including active pixels receiving light, and an optical black (OB) pixel array including OB pixels shielded from light.

The comparator 13 may compare a pixel signal PIX, applied from the pixels of the pixel array 11, and a ramp signal RAMP, applied from the ramp signal generator 15, to output a comparison signal OUT. The counter 14 may output a count value based on the comparison signal OUT output from the comparator 13. For example, the count value may be a digital code value corresponding to the number of clocks counted based on the comparison signal OUT. As described above, the image sensor 10 may perform an analog-to-digital conversion (ADC) operation using the comparator 13 and the counter 14.

For example, the image sensor 10 may perform a correlated double sampling (CDS) operation. For example, a pixel signal PIX may include a reset signal and an image signal. Accordingly, the counter 14 may generate a count value corresponding to the reset signal and a count value corresponding to the image signal. The counter 14 may subtract the count value corresponding to the reset signal from the count value corresponding to the image signal to obtain a pixel value from which a fixed pattern noise component is removed. In this case, the obtained pixel value may contain a dark current component.

To remove such a dark current component, during a readout operation, the image sensor 10 may read out pixel signals of the OB pixel array to obtain dark current data, and may then read out pixel signals of the active pixel array to obtain an active pixel value. Accordingly, the ISP front-end 12 may subtract the dark current data from the active pixel value to obtain an active pixel value from which the dark current component is removed.

An amount of dark current is exponentially increased as temperature of the image sensor is increased. Accordingly, when the image sensor 10 is exposed to a high-temperature environment, a dark current component of a pixel signal may be significantly increased. When the dark current component is increased to a predetermined level or more, loss of the pixel signal may occur during the readout operation.

Figure 2A:
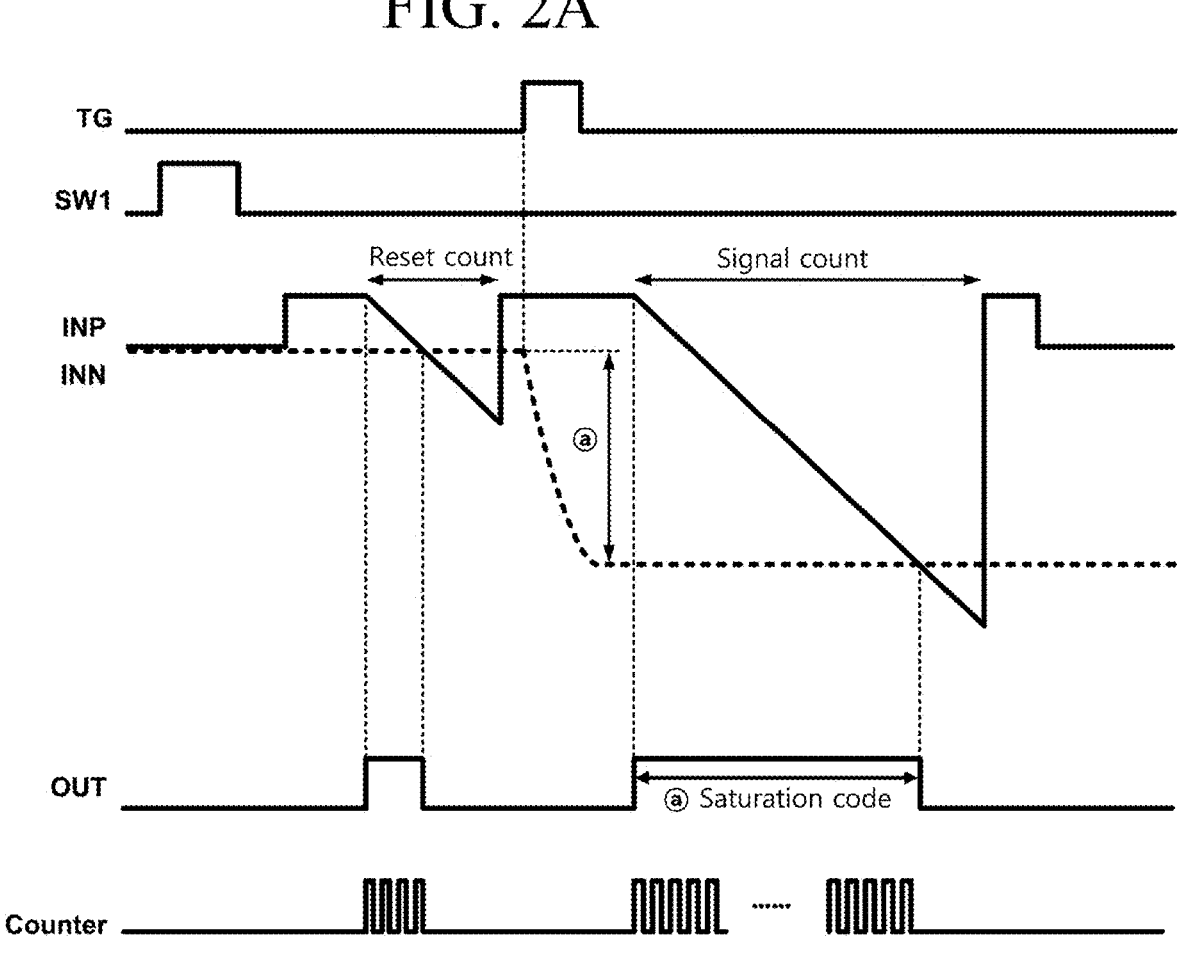
FIG. 2A is a timing diagram of the image sensor of FIG. 1A in a room-temperature environment.
Figure 2B:
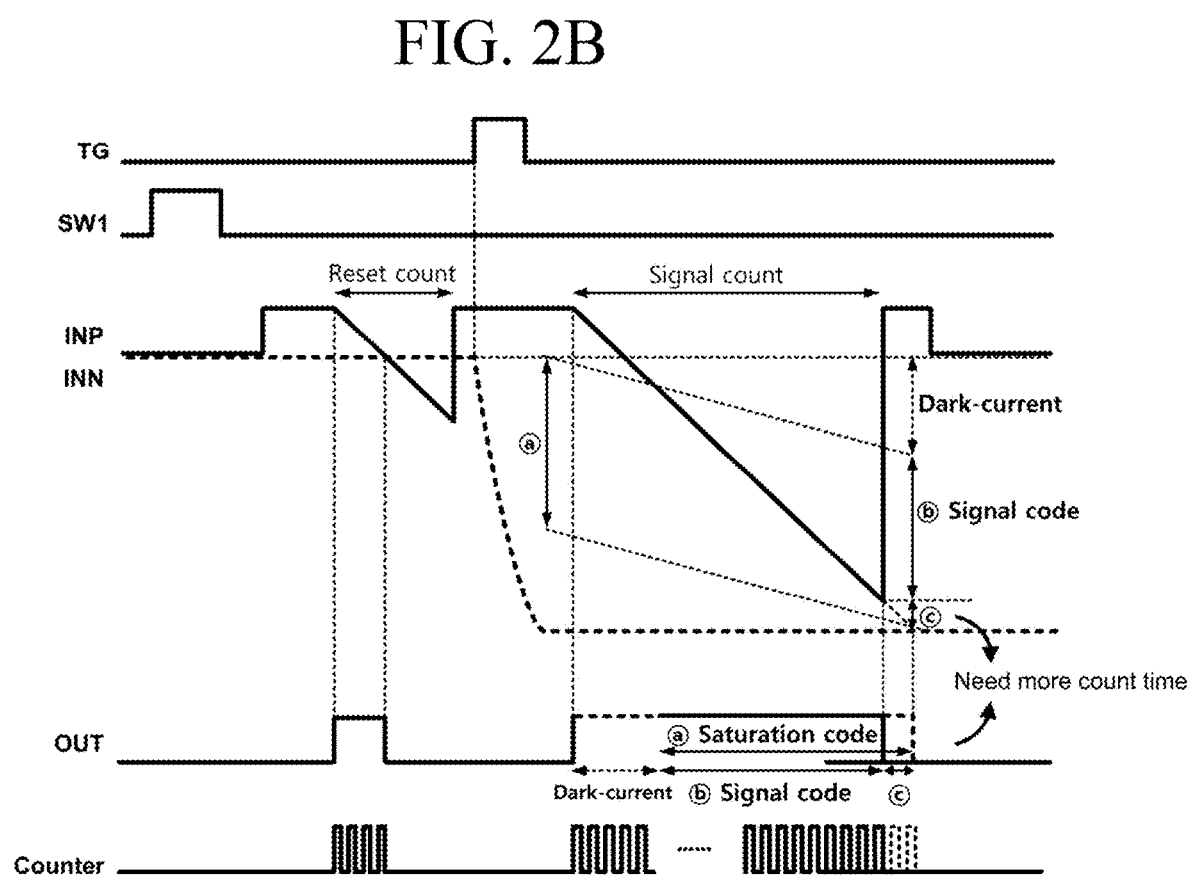

For example, FIGS. 2A and 2B illustrate timing diagrams of the image sensor 10 in a room-temperature environment and a high-temperature environment, respectively. Referring to FIGS. 1B and 2A, before a control signal TG moving electrons generated from a photodiode PD of a pixel 11-1 to a floating diffusion node FD is enabled, a reset count, for example, a reset operation based on the reset signal is completed. Then, when the control signal TG is enabled and a pixel signal PIX is stabilized, a counter 14 (e.g., see FIG. 1A) may start a signal count, for example, a count operation on an image signal.

In this case, a normal saturation code ⓐ may be obtained and provided as a comparison signal OUT in a typical room-temperature environment, as illustrated in FIG. 2A. The saturation code ⓑ is a maximum value of a dynamic range within which a pixel signal PIX is read out. For example, when image data generated by the image sensor 10 is 12 bits of data, the saturation code ⓐ may be 4096 LSB, but example embodiments are not limited thereto. Here, "LSB" refers to a unit of quantization.

However, the dark current component is significantly increased in the high-temperature environment, so that a portion ⓒ, which is unable to be counted, may be present in a pixel signal due to the dark current component (ⓐ=ⓑ+ⓒ), as illustrated in FIG. 2B. This may result in loss of the pixel signal or limitation of the dynamic range within which the pixel signal is read out. Even when an operation of removing a dark current component is performed at the ISP front-end 12 later, the portion c which is not counted is unable to be recovered.

Hereinafter, an example embodiment will be described, in which a dark current component increased in a high-temperature environment may be covered.

Figure 3A:
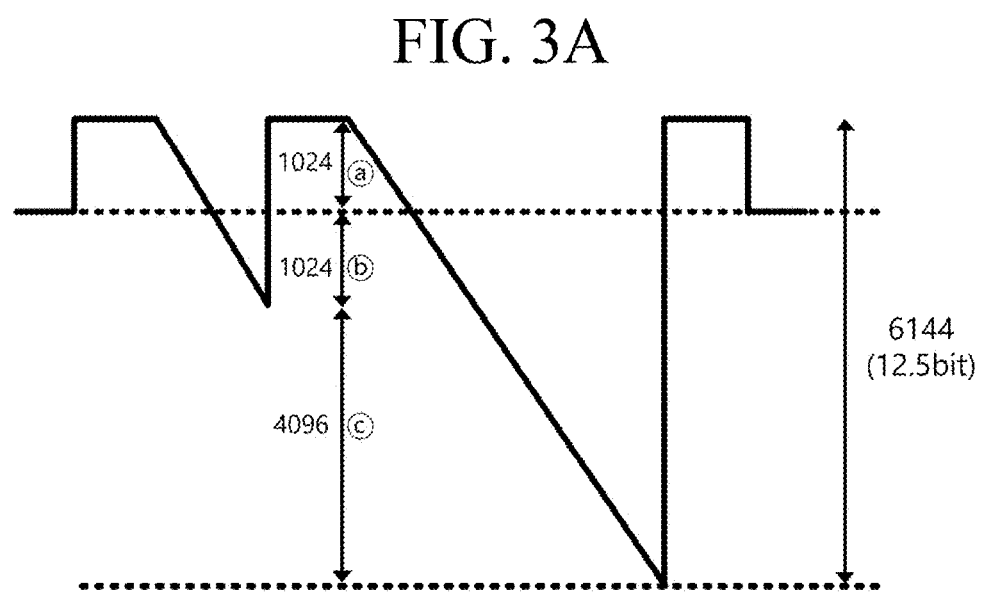
Figure 3B:
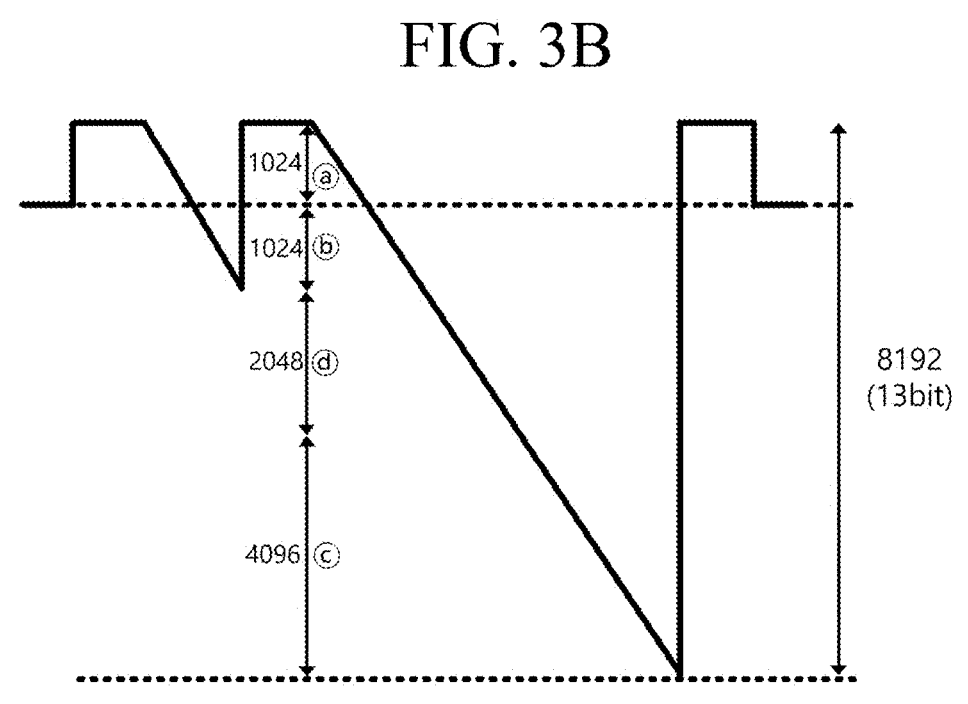

FIGS. 3A and 3B are diagrams illustrating image sensor operation according to example embodiments. For example, FIGS. 3A and 3B illustrate ramp signal waveforms of a single-slope analog-to-digital converter (ADC). In FIGS. 3A and 3B, ⓐ (1024 LSB) and ⓑ represent codes considering linearity of a ramp waveform and operation distribution of column circuits (for example, a comparator, a counter, or the like), and ⓒ (4096 LSB) represents a saturation code with respect to 12 bits.

For example, an image signal count time corresponding to at least 6144 LSB (1024+1024+4096) is required for the operation of the image sensor 10, as illustrated in FIG. 3A. However, the image signal count time is a time when the dark current component is not fully taken into account.

According to example embodiments, ⓓ (2048 LSB) may be additionally secured to cover a dark current component increased in a high-temperature environment, as illustrated in FIG. 3B.

However, in this case, a frame rate of the image sensor 10 may be reduced due to an increase in count time. Since the frame rate is a trade-off with power consumption, the power consumption of the image sensor 10 may increase as the frame rate decreases. In addition, bit-depth may be likely to increase.

Hereinafter, various example embodiments will be described, in which a dark current component may be efficiently removed without loss of a pixel signal in a high-temperature environment even when a count time is additionally secured.

Figure 4:
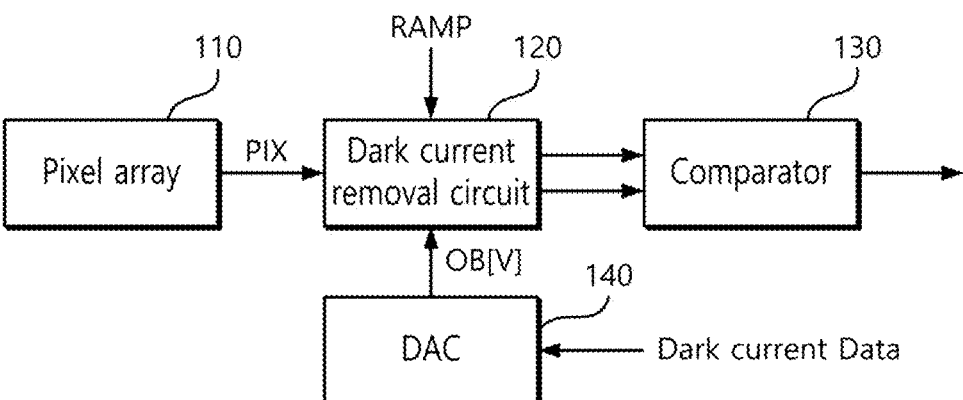
FIG. 4 is a block diagram of an image sensor according to example embodiments.

FIG. 4 is a block diagram illustrating a configuration of an image sensor according to example embodiments. Referring to FIG. 4, an image sensor 100 may include a pixel array 110, a dark current removal circuit 120, a comparator 130, and a digital-to-analog converter (DAC) 140.

The pixel array 110 may include active pixels and optical black pixels. The active pixels may be pixels for receiving light and may generate a pixel signal PIX based on incident light. The pixel signal PIX of the active pixels may include a dark current component as well as a photocurrent component caused by the incident light. The dark current component is generated in a pixel itself regardless of light and is an important cause of deteriorating performance of the image sensor. Therefore, the dark current component needs to be removed from the pixel signal PIX of the active pixels.

Data on a dark current component is required to remove the dark current component. Optical block pixels (hereinafter, referred to as "OB pixels") may be used to obtain the data on the dark current component.

For example, the OB pixels are completely shielded from light through a shielding film, or the like, and thus are unable to generate photocurrent. Accordingly, the pixel signal PIX generated by the OB pixels may include only a dark current component. As a result, the image sensor 100 may read out the pixel signal PIX of the OB pixels to obtain dark current data on the dark current component. In this case, the dark current data may be a representative value, among OB pixel values, but example embodiments are not limited thereto.

The comparator 130 may include a first input terminal and a second input terminal, and may compare voltages of signals, applied through the two input terminals, to output a comparison signal. In this case, the comparison signal may have either one of two state values (high and low state values).

According to example embodiments, the comparator 130 may include a first input terminal, to which the pixel signal PIX is applied, and a second input terminal to which a ramp signal RAMP is applied. For example, the pixel signal PIX and the ramp signal RAMP may be applied to the comparator 130 through the dark current removal circuit 120. The image sensor 100 may obtain a pixel value corresponding to the pixel signal PIX based on a comparison signal output by the comparator 130.

The DAC 140 may convert an input digital signal into a corresponding analog voltage signal, and may output the analog voltage signal. According to example embodiments, the DAC 140 may generate an optical black voltage (hereinafter, referred to as an "OB voltage") based on the dark current data.

The dark current removal circuit 120 may remove a dark current component from a pixel signal of an active pixel. For example, the dark current removal circuit 120 may reflect an OB voltage in at least one of the pixel signal PIX and the ramp signal RAMP applied to the comparator 130 during a readout period of the active pixel. For example, at least one of the pixel signal PIX and the ramp signal RAMP applied to the comparator 130 during a readout period of the active pixel may be adjusted by the OB voltage.

For example, the dark current removal circuit 120 may apply the pixel signal PIX and the ramp signal RAMP to the first input terminal and the second input terminal of the comparator during the readout period of the active pixel, respectively. In this case, the dark current removal circuit 120 may apply a compensation voltage, corresponding to the OB voltage, to at least one of the first input terminal and the second input terminal to reflect the OB voltage in at least one of the pixel signal PIX and the ramp signal RAMP.

For example, the dark current removal circuit 120 may reflect the OB voltage in the pixel signal PIX during the readout period of the active pixel, and may apply the pixel signal PIX, in which the OB voltage is reflected, and the ramp signal RAMP to the first input terminal and the second input terminal of the comparator 130, respectively.

Alternatively, the dark current removal circuit 120 may reflect the OB voltage in the ramp signal RAMP during the readout period of the active pixel, and may apply the pixel signal PIX and the ramp signal RAMP, in which the OB voltage is reflected, to the first input terminal and the second input terminal of the comparator 130, respectively.

Alternatively, the dark current removal circuit 120 may reflect the OB voltage in each of the pixel signal PIX and the ramp signal RAMP during the readout period of the active pixel, and may apply the pixel signal PIX, in which the OB voltage is reflected, and the ramp signal RAMP, in which the OB voltage is reflected, to the first input terminal and the second input terminal of the comparator 130, respectively.

Accordingly, the comparator 130 may compare voltages of signals, applied through the first and second input terminals, to output a comparison signal, and the image sensor 100 may obtain a pixel value based on the comparison signal output by the comparator 130. In this case, the pixel value is obtained based on the pixel signal PIX and/or the ramp signal RAMP in which the OB voltage is reflected, so that a dark current component is not included in the pixel value. As described above, the OB voltage may be reflected in at least one of the pixel signal PIX and the ramp signal RAMP to read out the pixel signal PIX from which the dark current component is removed.

As described above, the image sensor 100 according to example embodiments may perform an ADC operation based on the comparator 130 and may remove a dark current component in an analog domain in advance. Thus, the dark current component may be removed more efficiently.

For example, the image sensor 100 according to example embodiments may remove a dark current component in the analog domain using signals applied to input terminals of the comparator 130. Therefore, the image sensor 100 may efficiently remove the dark current component without an issue such as a decrease in readout dynamic range of a pixel signal in a high-temperature environment even when a count time is not additionally secured.

Hereinafter, a detailed configuration and operations of an image sensor 100 according to various example embodiments will be described with reference to remaining drawings. The contents of the above-described configuration and operations of the image sensor 10, which do not conflict with the following descriptions, may be applied to example embodiments of the image sensor 100 to be described below.

FIG. 5 is a block diagram of an image sensor according to example embodiments. Referring to FIG. 5, an image sensor 100A may include a pixel array 110, a row decoder 115, a dark current removal circuit 120A, a comparator 130 (e.g., a plurality of comparators), a DAC 140, a ramp signal generator 150, a column ramp buffer 155, a counter 160 (e.g., a plurality of counters), and an ISP front-end 170.

The pixel array 110 may include an active pixel array and an OB pixel array. The active pixel array may include a plurality of active pixels arranged in a matrix. The active pixels may be pixels for receiving light, and may photoelectrically transform incident light to generate a pixel signal, an electrical signal. In this case, the pixel signal may include both a photocurrent component generated by light and a dark current component generated in a pixel itself regardless of light. A configuration of the active pixel may be the same as the reference numeral 11-1 of FIG. 1B, but example embodiments are not limited thereto.

The OB pixel array may include a plurality of OB pixels completely shielded from externally incident light. Since the OB pixels are shielded from the light, photocurrent cannot be generated by the light. Accordingly, a pixel signal generated by the OB pixels may include only a dark current component, and the image sensor 100A may read out the OB pixel array to obtain dark current data on the dark current component.

According to example embodiments, the OB pixel array may include a top OB pixel array, arranged on an upper end of the active pixel array, and a bottom OB pixel array arranged on a lower end of the active pixel array, as illustrated in FIG. 5. However, the number or arrangement location of the OB pixel array is not limited thereto.

The row decoder 115 may drive the pixel array 110 in units of row lines. For example, the row decoder 115 may generate a control signal for outputting a pixel signal under the control of a timing controller, not illustrated, and may provide the generated control signal to the pixel array 110 in units of row lines. Accordingly, pixels of the pixel array 110 may output a pixel signal through a column line CL in units of row lines in response to the control signal.

According to example embodiments, the row decoder 115 may apply a control signal for outputting a pixel signal to the pixel array 110 in the order of the OB pixel array and the active pixel array during a single frame time. Accordingly, the pixels of the pixel array 110 may for example output pixel signals in the order of the top OB pixels, the bottom OB pixels, and the active pixels.

Each of the pixel signals output from the pixel array 110 may include a reset signal and an image signal, and may be input to the comparator 130 through the dark current removal circuit 120A.

The ramp signal generator 150 may generate a ramp signal having a voltage increasing or decreasing with a desired and/or alternatively predetermined slope (e.g., hereinafter which may be referred to as a "predetermined slope") under the control of a timing controller, not illustrated. For example, the ramp signal generator 150 may generate a first ramp signal corresponding to a reset signal and a second ramp signal corresponding to an image signal. The ramp signal RAMP generated by the ramp signal generator 150 may be input to the comparator 130 through the dark current removal circuit 120A.

The column ramp buffer (e.g., CRB) 155 may serve to reduce an adverse effect on the ramp signal RAMP that may occur due to the operation of the individual comparator 130. Accordingly, a clear ramp signal may be input to an individual comparator 130 through the column ramp buffer 155. According to example embodiments, the column ramp buffer 155 may be omitted.

The comparator 130 may be provided for each column of the pixel array 110 and may include a first input terminal, to which a pixel signal is input, and a second input terminal to which a ramp signal RAMP is input. The comparator 130 may compare the pixel signal and the ramp signal RAMP of the pixel array 110, respectively input through the first input terminal and the second input terminal, to generate a comparison signal. For example, the comparator 130 may compare a reset signal and a first ramp signal to generate a first comparison signal corresponding to the reset signal, and may compare an image signal and a second ramp signal to generate a second comparison signal corresponding to the image signal. The comparison signals generated by the comparator 130 may be output to a corresponding counter 160.

The comparison signal may transition from a first level (for example, a high level) to a second level (for example, a low level) at a time point at which the voltage of the ramp signal RAMP becomes equal to the voltage of the pixel signal. However, example embodiments are not limited thereto. A time point, at which the level of the comparison signal transitions, may be determined based on a voltage level of the pixel signal.

The counter 160 may be provided for each column of the pixel array 110, and may generate a count value based on the comparison signal output from the comparator 130. For example, the count value may be a digital code value corresponding to the number of clocks counted based on the comparison signal.

For example, the counter 160 may generate a first count value for the reset signal based on a first comparison signal, and may generate a second count value for the image signal based on a second comparison signal.

The counter 160 may also generate a count value, from which a fixed pattern noise (FPN) component is removed, based on the first and second count values. For example, the counter 160 may generate a count value, from which the FPN component is removed, by subtracting the first count value from the second count value using a correlated double sampling (CDS) scheme. The count value, from which the FPN component is removed, may be a pixel value.

The count values generated by counter 160 may be output to ISP front-end 170.

The counter 160 may constitute an ADC of the image sensor 100A together with the comparator 130. For example, the ADC may be referred to as a readout circuit.

The ISP front-end 170 may perform various image signal processing based on count values output from the counter 160. For example, according to example embodiments, the ISP front-end 170 may generate dark current data based on the pixel signal of the OB pixels.

For example, when the pixel signal of the OB pixel is input to the comparator 130, the comparator 130 may compare the pixel signal of the OB pixel with the ramp signal to output a comparison signal. Accordingly, the counter 160 may generate a count value based on the comparison signal and may output the generated count value to the ISP front-end 170. In this case, the pixel signal of the OB pixel includes only the dark current component, so that the count value output by the counter 160 may represent the dark current component.

Accordingly, the ISP front-end 170 may generate dark current data based on count values for the pixel signals of the OB pixels. For example, the ISP front-end 170 may calculate an average value of the count values of the OB pixels and may generate the calculated average value as the dark current data, but example embodiments are not limited thereto.

The calculated dark current data may represent the dark current component of the pixel array 110, and may be used to remove a dark current component from a pixel signal of an active pixel, as will be described later.

The ISP front-end 170 may be a portion of an image signal processor (ISP), but example embodiments are not limited thereto. In some embodiments, the ISP front-end 170 may be implemented as a logic circuit, separate from the ISP.

As described above, the image sensor 100A according to example embodiments may remove a dark current component of a pixel signal in an analog domain. Therefore, according to example embodiments, the ISP front-end 170 may not perform an operation of subtracting dark current data from a pixel value of an active pixel, which is different from a typical method of removing a dark current component, but example embodiments are not limited thereto.

The DAC 140 may generate an OB voltage corresponding to the dark current data. For example, when dark current data, a digital signal, is input from the ISP front-end 170, the DAC 140 may generate and provide an OB voltage, an analog voltage corresponding to the input dark current data, to the dark current removal circuit 120. In FIG. 5, "OB data" represents dark current data.

The dark current removal circuit 120A may remove a dark current component from a pixel signal of an active pixel. For example, the dark current removal circuit 120A may apply the pixel signal of the active pixel to the first input terminal of the comparator 130 and the ramp signal to RAMP to the second input terminal of the comparator 130 during a readout period of the active pixel. For example, the dark current removal circuit 120A may apply a compensation voltage corresponding to the OB voltage to at least one of the first and second input terminals of the comparator 130.

Accordingly, the comparator 130 may output a comparison signal based on the pixel signal and/or the ramp signal RAMP to which the OB voltage is reflected. In this case, the output comparison signal may be the same as a comparison signal output based on a pixel signal having no dark current component. As a result, the counter 160 may generate a count value based on the comparison signal to obtain a pixel value of the active pixel from which the dark current component is removed.

As described above, according to example embodiments, a compensation voltage corresponding to the OB voltage may be applied to at least one of the first and second input terminals of the comparator 130 during the readout period of the active pixel to remove the dark current component from the pixel sign of the active pixel.

The dark current removal circuit 120A may be provided for each column of the pixel array 110, and may include a plurality of switches for applying a compensation voltage corresponding to the OB voltage to at least one of the first and second input terminals of the comparator 130. For example, the plurality of switches may be implemented as various MOSFETs or bipolar junction transistors (BJTs), but example embodiments are not limited thereto.

Operations of the plurality of switches may be controlled by switch control signals applied from an external entity. For example, the switch control signals may be provided from a controller (not shown) controlling an operation of the comparator 130 or the counter 160. Alternatively, according to example embodiments, the switch control signals may be provided from an additional controller controlling an operation of the dark current removal circuit 120A or may be provided from a timing controller, not illustrated, controlling an operation timing of each component of the image sensor 100A.

FIG. 6 is a diagram illustrating a detailed configuration of a dark current removal circuit 120A according to example embodiments, together with peripheral circuits.

Referring to FIG. 6, a comparator 130 may include a first input terminal INN, to which a pixel signal PIX is applied, and a second input terminal INP to which the ramp signal RAMP is applied. For example, the comparator 130 may include two operational transconductance amplifiers (OTAs) OTA1 and OTA2, but example embodiments are not limited thereto.

The dark current removal circuit 120A may include a first capacitor 121, having one end to which the pixel signal PIX is applied and the other end connected to the first input terminal INN, and a second capacitor 122 having one end to which the ramp signal RAMP is applied and the other end connected to the second input terminal INP.

The dark current removal circuit 120A may further include a third capacitor 123, applying a first compensation voltage increased by a magnitude of an OB voltage to the first input terminal INN, and a fourth capacitor 124 applying a second compensation voltage decreased by the magnitude of the OB voltage to the second input terminal INP.

For example, the first and second compensation voltages may be generated through operations of a plurality of switches 125-1, 125-2, 126-1, and 126-2 connected to a ground voltage VSSA or an OB voltage OB output by a DAC 140.

For example, the dark current removal circuit 120A may include a first switch 125-1, a second switch 125-2, a third switch 126-1, and a fourth switch 126-2. In this case, the first switch 125-1 may have one end, connected to a ground voltage, and the other end connected to the third capacitor 123. The second switch 125-2 may have one end, connected to an OB voltage, and the other end connected to the third capacitor 123. The third switch 126-1 may have one end, connected to a ground voltage, and the other end connected to the fourth capacitor 124. The fourth switch 126-2 may have one end, connected to an OB voltage, and the other end connected to the fourth capacitor 124.

Accordingly, when the turned-on first switch 125-1 is turned off and the turned-off second switch 125-2 is turned on, a first compensation voltage increased by a magnitude of an OB voltage may be generated. Thus, the first compensation voltage may be applied to the first input terminal INN of the comparator 130 through the third capacitor 123.

In addition, when the turned-off third switch 126-1 is turned on and the turned-on fourth switch 126-2 is turned off, a second compensation voltage decreased by the magnitude of the OB voltage may be generated. Thus, the second compensation voltage may be applied to the second input terminal INP of the comparator 130 through the fourth capacitor 124.

FIG. 7A is a circuit diagram illustrating an operation of a dark current removal circuit 120A according to example embodiments, and FIG. 7B is a timing diagram illustrating an operation of an image sensor 100A associated with the example embodiment of FIG. 7A. In FIG. 7B, "OUT" represents a comparison signal output by a comparator 130 and "Counter" represents a counting operation performed by a counter 160, which will be equally applied to FIGS. 8B, 9B, 14A, 14B, and 14C.

According to example embodiments, the dark current removal circuit 120A may apply a first compensation voltage to a first input terminal INN and apply a ground voltage VSSA to a fourth capacitor 124 during a readout period of an active pixel.

For example, referring to FIG. 7A, a switch control signal SW2 may be applied to a first switch 125-1, a switch control signal SW2 may be applied to a second switch 125-2, a switch control signal SW3 may be applied to a third switch 126-1, and a switch control signal SW3 may be applied to a fourth switch 126-2. In this case, SW2 and SW2 indicate that levels of the switch control signals, respectively applied to the first switch 125-1 and the second switch 125-2, are opposite to each other. This is equally applied to SW3 and $\overline{SW3}$.

Referring to FIG. 7B, SW3 is maintained at a high level. Accordingly, it can be seen that the ground voltage VSSA is applied to the fourth capacitor 124 during the readout period of the active pixel.

On the other hand, it can be seen that SW2 transitions from a low level to a high level during the readout period of the active pixel. In a period in which SW2 is at a low level, the first and second switches 125-1 and 125-2 are maintained at a turned-on state and a turned-off state, respectively. Then, when SW2 transitions to a high level, the first and second switches 125-1 and 125-2 are turned off and turned on, respectively. Accordingly, it can be seen that a first compensation voltage increased by the magnitude of the OB voltage is generated at a time point, at which SW2 transitions to the high level, and is then applied to the first input terminal INN of the comparator 130 through a third capacitor 123.

When the first compensation voltage is applied, a voltage at the first input terminal INN may increase by a magnitude of an OB voltage corresponding to a dark current component. Then, when a control signal TG is enabled, a pixel signal PIX may be applied to the first input terminal INN while moving electrons to a floating diffusion (FD) node of the active pixel.

For example, according to example embodiments, the dark current removal circuit 120A may enable a signal SW2 to apply a first compensation voltage to the first input terminal INN before the pixel signal PIX is applied to the first input terminal INN, for example, when the control signal TG is turned on, as illustrated in FIG. 7B. Accordingly, the pixel signal PIX is applied to the first input terminal INN in a state in which the voltage at the first input terminal INN increases by the magnitude of the OB voltage, so that a normal saturation code may be output without loss of the pixel signal PIX even when a dark current component is significantly increased in a high-temperature environment.

However, example embodiments are not limited thereto. For example, unlike what is illustrated in FIG. 7B, the dark current removal circuit 120A may apply a first compensation voltage to the first input terminal INN after the pixel signal PIX is applied to the first input terminal INN. In this case, the dark current removal circuit 120A may apply the first compensation voltage to the first input terminal INN until a counting operation of the counter 160 starts.

A time point, at which the counting operation of the counter 160 starts, may be the same as a time point at which a ramp signal is applied to the second input terminal INP (for example, a voltage at the second input terminal INP varies with a predetermined slope depending on the ramp signal). Therefore, according to example embodiments, the voltage at the second input terminal INP may vary with a predetermined slope depending on the ramp signal after the first compensation voltage is applied to the first input terminal INN.

As described above, in the event that the first compensation voltage is not applied, in such a case, when the dark current component is significantly increased in a high-temperature environment, the pixel signal PIX would be applied to the first input terminal INN as illustrated by reference number 72. Thus, loss of the pixel signal PIX may occur during a readout period, as illustrated by reference numeral 71.

FIG. 8A is a circuit diagram illustrating an operation of the dark current removal circuit 120A according to example embodiments, and FIG. 8B is a timing diagram illustrating an operation of the image sensor 100A associated with the example embodiments of FIG. 8A.

According to example embodiments, the dark current removal circuit 120A may apply a second compensation voltage to the second input terminal INP and apply a ground voltage VSSA to the third capacitor 123 during the readout period of the active pixel.

For example, referring to FIG. 8A, the same switch control signals $\overline{SW2}$, SW2, SW3, and $\overline{SW3}$ as illustrated in FIG. 7A may be applied to the first to fourth switches 125-1, 125-2, 126-1, and 126-2, respectively.

Referring to FIG. 8B, SW2 is maintained at a low level during the readout period of the active pixel. Accordingly, it can be seen that the ground voltage VSSA is applied to the third capacitor 123.

In FIG. 8B, it can be seen that SW3 transitions from a low level to a high level during the readout period of the active pixel. In a period in which SW3 is at a low level, the third and fourth switches 126-1 and 126-2 are maintained in a turned-off state and a turned-on state, respectively. Then, when SW3 transitions to a high level, the third and fourth switches 126-1 and 126-2 are turned on and turned off, respectively. Accordingly, it can be seen that when SW3 transitions to a high level, a second compensation voltage decreased by a magnitude of an OB voltage is generated and applied to the second input terminal INP of the comparator 130 through the fourth capacitor 124.

When the second compensation voltage is applied, the voltage at the second input terminal INP may be decreased by the magnitude of the OB voltage corresponding to the dark current component, and then the ramp signal RAMP may start to vary with a predetermined slope.

For example, according to example embodiments, the ramp signal RAMP starts to vary in a state in which the voltage at the second input terminal INP is decreased by the magnitude of the OB voltage, so that the dark current component may be significantly increased in a high-temperature environment. However, a normal saturation code may be output without loss of the pixel signal PIX.

As described above, in the event that the second compensation voltage is not applied, in such a case, when the dark current component is significantly increased in the high-temperature environment, the ramp signal RAMP would be applied to the second input terminal INP as illustrated by reference numeral 82. Accordingly, loss of the pixel signal may occur during the readout period, as illustrated by reference numeral 81.

FIG. 9A is a circuit diagram illustrating an operation of the dark current removal circuit 120A according to example embodiments, and FIG. 9B is a timing diagram illustrating an operation of the image sensor 100A associated with the example embodiments of FIG. 9A.

According to example embodiments, the dark current removal circuit 120A may apply a first compensation voltage to the first input terminal INN and apply a second compensation voltage to the second input terminal INP during the readout period of the active pixel. In this case, the dark current removal circuit 120A may apply the first compensation voltage to the first input terminal INN before the pixel signal PIX is applied to the first input terminal INN, and the ramp signal RAMP may start to vary with a predetermined slope after the second compensation voltage is applied to the second input terminal INP.

For example, referring to FIG. 9A, the same switch control signals SW2, SW2, SW3, and SW3 as illustrated in FIG. 7A may be applied to the first to fourth switches 125-1, 125-2, 126-1, and 126-2, respectively.

In this case, referring to FIG. 9B, it can be seen that SW2 transitions from a low level to a high level during the readout period of the active pixel. In a period in which SW2 is at a low level, the first and second switches 125-1 and 125-2 are maintained in a turned-on state and a turned-off state, respectively. Then, when SW2 transitions to a high level, the first and second switches 125-1 and 125-2 are turned off and turned on, respectively. Accordingly, it can be seen that when SW2 transitions to a high level, the first compensation voltage increased by a magnitude of an OB voltage is generated and applied to the first input terminal INN of the comparator 130 through the third capacitor 123. When the first compensation voltage is applied, the voltage at the first input terminal INN is increased by a magnitude of an OB voltage corresponding to the dark current component. Then, when the control signal TG is enabled, the pixel signal PIX is applied to the first input terminal INN while moving electrons a floating diffusion (FD) node of the active pixel.

Referring to FIG. 9B, it can be seen that SW3 also transitions from a low level to a high level during the readout period of the active pixel. During a period in which SW3 is at a low level, the third and fourth switches 126-1 and 126-2 are maintained in a turned-off state and a turned-on state, respectively. Then, when SW3 transitions to a high level, the third and fourth switches 126-1 and 126-2 are turned on and off, respectively. Accordingly, it can be seen that when SW3 transitions to a high level, a second compensation voltage decreased by a magnitude of an OB voltage is generated and applied to the second input terminal INP of the comparator 130 through the fourth capacitor 124. When the second compensation voltage is applied, a voltage at the second input terminal INP is decreased by the magnitude of the OB voltage corresponding to the dark current component, and then the ramp signal RAMP starts to vary with a predetermined slope.

As described above, according to example embodiments, the OB voltage corresponding to the dark current data may be reflected in both the first input terminal INN and the second input terminal INP of the comparator 130. In this case, the pixel signal PIX is applied to the first input terminal INN in a state in which the voltage at the first input terminal INN is increased by the magnitude of the OB voltage and the ramp signal RAMP starts to vary in a state in which the voltage at the second input terminal INP is decreased by the magnitude of the OB voltage, so that a normal saturation code may be output without loss of the pixel signal PIX even when the dark current component is significantly increased in a high-temperature environment.

In the above-described embodiments of FIGS. 5 to 9B, the magnitude of the pixel signal PIX applied to the first input terminal INN and the magnitude of the ramp signal RAMP input to the second input terminal INP may be decreased. This is because voltage division occurs between the first capacitor 121 and the third capacitor 123 when the pixel signal PIX is applied to the first input terminal INN and voltage division occurs between the second capacitor 122 and the fourth capacitor 124 when the ramp signal RAMP is applied to the second input terminal INP. When the signals applied to the comparator 130 decrease in magnitude, signal conversion efficiency of the comparator 130 may be reduced to cause an increase in noise. However, such an increase in noise is negligible in a situation in which noise caused by a dark current component is dominant, and thus is not an issue.

FIG. 10 is a block diagram of an image sensor 100B according to example embodiments. Referring to FIG. 10, the image sensor 100B may include a pixel array 110, a row decoder 115, a dark current removal circuit 120B, a comparator 130 (e.g., a plurality of comparators), a DAC 140, a ramp signal generator 150, a column ramp buffer 155, a counter 160 (e.g., a plurality of counters), an ISP front-end 170, a switch controller 128, and a temperature sensor 129.

As compared with the image sensor 100A of FIG. 5, the image sensor 100B of FIG. 10 may further include a switch controller 128 and a temperature sensor 129 and there are differences in a portion of components of the dark current removal circuit 120B. Since the rest of the components are the same as those of the image sensor 100A, redundant descriptions will be omitted and the following description will focus on the differences.

As described above, in the case of the example embodiments of FIGS. 5 to 9B, the magnitudes of the signals applied to the comparator 130 may be decreased to increase noise. Accordingly, there may be considered example embodiments in which an image sensor operates as illustrated in FIGS. 5 to 9B in a high-temperature environment, in which a dark current component is dominant, to remove the dark current component and operates in a room-temperature environment, in which a dark current component is not dominant, so as not to reduce magnitudes of a pixel signal PIX and a ramp signal RAMP applied to the comparator 130.

For example, according to example embodiments, the image sensor 100B may operate in two different modes depending on an amount of a dark current component included in a pixel signal. For example, the two modes may include a first mode (for example, a room-temperature mode), in which the image sensor 100B operates so as not to reduce magnitudes of a pixel signal PIX and a ramp signal RAMP applied to the comparator 130 without removal of a dark current component, and a second mode (for example, a high-temperature mode) in which the image sensor 100 operates as in the example embodiments of FIGS. 5 to 9B to remove a dark current component.

According to example embodiments, the image sensor 100B may change an operation mode based on a desired and/or alternatively predetermined temperature (e.g., hereinafter which may be referred to as a "predetermined temperature"). Since the dark current component has a characteristic of exponentially increasing with temperature, a temperature of the image sensor 100B may be used as a criterion for determining the amount of the dark current component. For example, the image sensor 100B may include a temperature sensor 129 sensing the temperature of the image sensor 100B. The switch controller 128 may control operations of switches, included in the dark current removal circuit 120B, based on the temperature of the image sensor 100B sensed by the temperature sensor 129 to change an operation mode. Accordingly, the image sensor 100B may operate in the high-temperature mode when the temperature of the image sensor 100B is higher than or equal to a predetermined temperature, and may operate in the room-temperature mode when the temperature of the image sensor 100B is lower than the predetermined temperature.

As described above, the value of the dark current data obtained by reading out the OB pixels represents the amount of the dark current component included in the pixel signal. Therefore, according to example embodiments, the image sensor 100B may change an operation mode based on the value of the dark current data. For example, the switch controller 128 may control operations of the switches included in the dark current removal circuit 120B based on dark current data (OB data), provided from the ISP front-end 170, to change an operation mode. Accordingly, the image sensor 100B may operate in the high-temperature mode when the dark current data is greater than or equal to a desired and/or alternatively predetermined value (e.g., hereinafter which may be referred to as a "predetermined value"), and may operate in a room-temperature mode when the dark current data is less than the predetermined value.

FIG. 10 illustrates both an example, in which the switch controller 128 receives temperature information from the temperature sensor 129 and controls an operation of the dark current removal circuit 120B, and an example in which the switch controller 128 receives dark current data from the ISP front-end 170 and controls an operation of the dark current removal circuit 120B, but example embodiments are not limited thereto and only one of the examples may be implemented.

FIG. 11 is a diagram illustrating a detailed configuration of a dark current removal circuit 120B according to example embodiments, together with peripheral circuits. Referring to FIG. 11, the dark current removal circuit 120B may further include a fifth switch 127-1 and a sixth switch 127-2, as compared with the dark current removal circuit 120A of FIG. 6.

Turn-on and turn-off operations of the fifth switch 127-1 may be controlled based on a switch control signal OP. When the fifth switch 127-1 is turned on, a first capacitor 121 and a third capacitor 123 may be connected in parallel. In addition, the turn-on and turn-off operations of the sixth switch 127-2 may be controlled based on a switch control signal OP. When the sixth switch is turned on, the second capacitor 122 and the fourth capacitor 124 may be connected in parallel.

For example, an operation mode of the dark current removal circuit 120B may be changed based on the switch control signal OP. For example, the dark current removal circuit 120B may include a room-temperature mode (RT mode), in which the fifth and sixth switches 127-1 and 127-2 are turned on, and a high-temperature mode (HT mode) in which the fifth and sixth switches 127-1 and 127-2 are turned off.

For example, the switch controller 128 may apply the switch control signal OP of a first level (for example, a low level) to the fifth and sixth switches 127-1 and 127-2 when the temperature of the image sensor 100B sensed by the temperature sensor 129 is higher than or equal to a predetermined temperature or when the dark current data provided from the ISP front-end 170 is greater than or equal to a predetermined value. Accordingly, the fifth and sixth switches 127-1 and 127-2 may be turned off, and the dark current removal circuit 120B may operate in the high-temperature mode.

While operating in the high-temperature mode, the dark current removal circuit 120B may have the same configuration as the dark current removal circuit 120A illustrated in FIG. 6 and may perform the operations described above with reference to FIGS. 7A to 9B. For example, while operating in the high-temperature mode, the dark current removal circuit 120B may apply a voltage corresponding to the OB voltage to at least one of the first input terminal INN and the second input terminal INP of the comparator 130.

When the temperature of the image sensor 100B sensed by the temperature sensor 129 is lower than the predetermined temperature or when the dark current data provided from the ISP front-end 170 is smaller than a predetermined value, the switch controller 128 may apply the switch control signal OP of a second level (for example, a high level) to the fifth and sixth switches 127-1 and 127-2. Accordingly, the fifth and sixth switches 127-1 and 127-2 may be turned on, and the dark current removal circuit 120B may operate in the room temperature mode.

While operating in the room temperature mode, the dark current removal circuit 120B may have the same configuration as illustrated in FIG. 12 and may apply a pixel signal PIX to the first input terminal INN through the first and third capacitors 121 and 123 connected in parallel and apply the ramp signal RAMP to the second input terminal INP through the second and fourth capacitors 122 and 124 connected in parallel. In this case, division of a voltage of the pixel signal between the first capacitor 121 and the third capacitor 123 may not occur, and a total capacitance value of the first and third capacitors 121 and 123 connected in parallel may be increased as compared with a capacitance value of the first capacitor 121. Therefore, transmission efficiency of the pixel signal may be increased as compared with that in the high-temperature mode. This may be equally applied to the ramp signal RAMP applied to the second input terminal INP through the second and fourth capacitors 122 and 124 connected in parallel.

For example, according to example embodiments, noise caused by the dark current component is dominant in the high-temperature environment, so that the dark current removal circuit 120B may operate in the high-temperature mode to remove the dark current component. In addition, the dark current component is not dominant in the room-temperature environment, so that the dark current removal circuit 120B may operate in the room-temperature mode to maintain signal transmission efficiency.

According to example embodiments, the first capacitor 121 and the second capacitor 122 may have the same capacitance value (for example, a first value). The third capacitor 123 and the fourth capacitor 124 may have the same capacitance value (for example, a second value). In this case, the transmission efficiency of the pixel signal PIX and the ramp signal RAMP may be improved as the first value becomes greater than the second value. Therefore, according to example embodiments, the first value may be greater than or equal to the second value.

When the first value and the second value are the same, for example, when the capacitance values of the first to fourth capacitors 121, 122, 123, and 124 are all the same, the DAC 140 may generate a first OB voltage based on dark current data. The generated first OB voltage may be applied to at least one of the first input terminal INN and the second input terminal INP while the dark current removal circuit 120B operates in the high-temperature mode, and may be used in an operation of removing a dark current component, as described above.

The second value may be smaller than the first value. Even in this case, when the DAC 140 generates a first OB voltage, a voltage lower than the first OB voltage may be applied to the first input terminal INN and/or the second input terminal INP. Therefore, according to example embodiments, the DAC 140 may generate a second OB voltage higher than the first OB voltage based on the dark current data when the second value is smaller than the first value. Accordingly, even when the second value is smaller than the first value, a voltage may be applied to the first input terminal INN and/or the second input terminal INP by the first OB voltage and the dark current component may be accurately removed.

FIG. 13 is a diagram illustrating example embodiments associated with a mode change operation of the image sensor 100B. In an example illustrated in FIG. 13, mode change occurs between an N-th frame and an N+1-th frame.

Referring to FIG. 13, when a switch control signal OP is at a high level, the fifth switch 127-1 and the sixth switch 127-2 may be turned on and the dark current removal circuit 120B may operate in the room-temperature mode (RT Mode). While the dark current removal circuit 120B operates in the room temperature mode, switch control signals $\overline{SW2}$, SW2, SW3, and $\overline{SW3}$ may all have low levels. Accordingly, all of the first to fourth switches 125-1, 125-2, 126-1, and 126-2 may be turned off, and the dark current removal circuit 120B may have the configuration illustrated in FIG. 12.

When the image sensor 100B has a temperature of a predetermined temperature or more, or the dark current data has a predetermined value or more while operating in the room-temperature mode, the switch control signal OP may transition from a high level to a low level. Accordingly, the fifth and sixth switches 127-1 and 127-2 may be turned off, and the dark current removal circuit 120B may operate in the high-temperature mode (HT Mode). When the dark current removal circuit 120B has the configuration illustrated in FIG. 6 while operating in the high-temperature mode, the switch control signals $\overline{SW2}$, SW2, SW3, and $\overline{SW3}$ may be applied to the first to fourth switches 125-1, 125-2, 126-1, and 126-2 according to example embodiments, as described above with reference to FIGS. 7A to 9B.

FIG. 14A is a timing diagram illustrating an operation of the image sensor 100B according to example embodiments. As described above, the image sensor 100B may operate in a room-temperature mode in a room-temperature environment and operate in a high-temperature mode in a high-temperature environment, based on temperature or dark current data. FIG. 14A illustrates example embodiments in which the first compensation voltage is applied to the first input terminal INN of the comparator 130 in a high-temperature environment HT, together with an operation in a room-temperature environment RT. In this case, the operation of the image sensor 100B in the high-temperature mode in a high-temperature environment is the same as described above with reference to FIGS. 7A and 7B, and redundant descriptions will be omitted.

From FIG. 14A, it can be seen that in a high-temperature environment, the pixel signal PIX is applied to the first input terminal INN in a state in which the voltage at the first input terminal INN is increased by the magnitude of the OB voltage (for example, the dark current component). Therefore, according to example embodiments, a saturation code may be normally obtained in a high-temperature environment, as well as in a room-temperature environment, as illustrated in the drawing.

From FIG. 14A, it can be seen that the magnitudes of the pixel signal PIX and the ramp signal RAMP are decreased in the high-temperature mode, as compared with the room-temperature mode. When all of the first to fourth capacitors 121, 122, 123, and 124 have the same capacitance value, the magnitudes of the pixel signal PIX and the ramp signal RAMP in the high-temperature mode may decrease by half as compared with those in the room-temperature mode. This is because in the high-temperature mode, the voltage at the pixel signal PIX is divided by the first capacitor 121 and the third capacitor 123 and the voltage at the ramp signal RAMP is divided by the second capacitor 122 and the fourth capacitor 124, as described above.

Accordingly, the analog gain may decrease by half, causing input-referred noise of the comparator 130 to increase by two times. However, dark current component noise is dominant in a high-temperature environment, so that the increased input-referred noise is negligible.

FIG. 14B is a timing diagram illustrating an operation of the image sensor 100B according to example embodiments. FIG. 14B illustrates example embodiments, in which the second compensation voltage is applied to the second input terminal INP of the comparator 130 in a high-temperature environment, together with an operation in a room-temperature environment. In this case, the operation of the image sensor 100B in the high-temperature mode in a high-temperature environment is the same as described above with reference to FIGS. 8A and 8B, and redundant description will be omitted.

In FIG. 14B, ⓐ represents a saturation code, ⓑ represents a dark current component, and ⓒ represents a code of a pixel signal PIX in a high-temperature environment. From FIG. 14B, it can be seen that in a high-temperature environment, a voltage of a ramp signal RAMP starts to vary in a state in which a voltage at a second input terminal INP decreases by a level of an OB voltage (for example, a dark current component). Accordingly, the saturation code may be normally obtained in not only a room-temperature mode but also a high-temperature mode, as illustrated in the drawing.

For ease of understanding an operation of removing a dark current component, attenuation of the pixel signal PIX and the ramp signal RAMP in the high-temperature mode is not illustrated in FIG. 14B. This is equally applied to FIG. 14C.

FIG. 14C is a timing diagram illustrating an operation of the image sensor 100B according to example embodiments. FIG. 14C illustrates example embodiments in which a first compensation voltage is applied to the first input terminal INN of the comparator 130 and a second compensation voltage is applied to the second input terminal INP of the comparator 130 in a high-temperature environment, together with an operation in a room-temperature environment. In this case, the operation of the image sensor 100B in the high-temperature mode in a high-temperature environment is the same as described above with reference to FIGS. 9A and 9B, and redundant description will be omitted.

From FIG. 14C, it can be seen that in a high-temperature environment, the pixel signal PIX is applied to the first input terminal INN in a state in which a voltage at the first input terminal INN increases by a level of an OB voltage (for example, a dark current component) and the ramp signal RAMP starts to vary in a state which a voltage at the second input terminal INP decreases by a magnitude of the OB voltage (for example, the dark current component). Therefore, according to example embodiments, a saturation code may be normally obtained not only in the room-temperature environment but also in the high-temperature environment, as illustrated in the drawing.

FIGS. 15A to 15C are diagrams illustrating an operation of an image sensor 100B according to example embodiments.

According to example embodiments, each pixel included in a pixel array 110 of the image sensor 100B may have a split photodiode structure including at least two photodiodes.

FIG. 15A is a diagram illustrating a pixel structure having a split photodiode structure according to example embodiments, and FIG. 15B is a diagram illustrating four operation modes of an image sensor 100B including pixels having a split photodiode structure.

Referring to FIG. 15A, a pixel 11-2 may include a small photodiode SPD having a small light receiving area and a large photodiode LPD having a larger light receiving area than the SPD. In addition, the pixel 11-2 may include a capacitor 17 in which electrons of the SPD are stored through a lateral overflow operation.

The LPD may be responsible for a low-illuminance pixel signal. The LPD may operate in a high conversion gain (HCG) mode in a lowest illuminance period and in a low conversion gain (LCG) mode in a general low-illuminance period. An LPD_HCG period and an LPD_LCG period of FIG. 15B represent two operation modes of the LPD, respectively the HCG mode and the LCG mode.

The SPD may also operate in such a manner of reading out a reset signal, and then reading out an image signal in the general high-illuminance period, and in such a manner of reading out an image signal, and then reading out a reset signal in a highest illuminance period. An SPD_RS period and an SPD_LOF period of FIG. 15B represent two operation modes of the SPD, respectively.

For example, in the highest illuminance period (the period SD_LOF of FIG. 15B), a large amount of signal may be stored using a high-capacity capacitor 17 while reducing sensitivity of the SPD to maintain a long exposure time. For example, in a high-illuminance region, electrons of the SPD may be stored in the capacitor 17 through a lateral overflow operation. The higher the capacity of capacitor 17, the more electrons may be stored in the capacitor 17. Accordingly, a dynamic range in the high-illuminance region may be expanded.

The capacitance of the capacitor 17 may be increased to increase capacity of accepting electrons. Even in this case, when an output range of a pixel signal is limited, the dynamic range may be restricted.

To address such an issue, the output range of the pixel signal may be increased using the above-described configuration of the dark current removal circuit 120B. According to example embodiments, the image sensor 100B may increase an output range of a pixel signal, output from a pixel, by attenuating only the magnitude of the pixel signal PIX applied to the first input terminal INN while maintaining the ramp signal RAMP, applied to the second input terminal INP of the comparator 130, as it is.

For example, the image sensor 100B may turn on the sixth switch 127-2 to connect the second capacitor 122 and the fourth capacitor 124 in parallel, as illustrated in FIG. 15C. In this case, the third switch 126-1 and the fourth switch 126-2 may be maintained in a turned-off state. Accordingly, the ramp signal RAMP may be applied to the second input terminal INP of the comparator 130 through the second and fourth capacitors 122 and 124 connected in parallel.

The image sensor 100B may turn off the fifth switch 127-1 and turn on the first switch 125-1. In this case, the second switch 125-2 may be maintained in a turned-off state. Accordingly, a voltage of the pixel signal PIX may be divided through the first capacitor 121 and the third capacitor 123, so that the pixel signal PIX may be applied to the first input terminal INN of the comparator 130.

Accordingly, for example, when the first to fourth capacitors 121, 122, 123, and 124 have the same capacitance value, the pixel signal PIX applied to the first input terminal INN may be attenuated by half, and thus the output range of the pixel signal PIX may increase by two times. Accordingly, the dynamic range of the high-illuminance region may be expanded by 6 [dB], which is indicated by "DR expansion" of FIG. 15B.

FIG. 16 is a flowchart illustrating a method of operating the image sensor 100 according to example embodiments. For example, the image sensor 100 may include active pixels, receiving light, and optical black (OB) pixels shielded from light. Also, the image sensor 100 may include a comparator 130 having a first input terminal, to which a pixel signal is applied, and a second input terminal to which a ramp signal is applied.

Referring to FIG. 16, in operation S1610, the image sensor 100 may obtain dark current data by reading out pixel signals of the OB pixels. Since the OB pixels are completely shielded from light through a shielding film, or the like, photocurrent is not generated and pixel signals generated by the OB pixels include only dark current components. Accordingly, the image sensor 100 may obtain dark current data on the dark current component by reading out the pixel signals PIX of the OB pixels. For example, the dark current data may be a representative value of OB pixel values obtained by reading out the pixel signals of the OB pixels. For example, the dark current data may be an average value of the OB pixel values, but example embodiments are not limited thereto.

In operation S1620, the image sensor 100 may generate an analog voltage corresponding to the dark current data. For example, the image sensor 100 may generate an analog voltage corresponding to dark current data using the DAC 140.

In operation S1630, the image sensor 100 may remove a noise component, caused by the dark current, from the pixel signals of the active pixels using the analog voltage corresponding to the dark current data. For example, the image sensor 100 may reflect an OB voltage in at least one of the first input terminal INN and the second input terminal INP of the comparator 130 during a readout period of the active pixels to remove the noise component, caused by the dark current, from the pixel signals of the active pixels.

Each of the above-described image sensors 100, 100A, and 100B may be a CMOS image sensor, but example embodiments are not limited thereto.

According to the above-described example embodiments, the image sensors 100, 100A, and 100B may efficiently remove a dark current component without an increase in count time or loss of a pixel signal even in a high-temperature environment.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

As set forth above, according to example embodiments, an image sensor may efficiently remove a dark current component.

While example embodiments have been shown and described above, it will be apparent to those skilled in the art that modifications and variations could be made without departing from the scope of the present inventive concept as defined by the appended claims.

What is claimed is:

1. An image sensor comprising:
   a pixel array comprising active pixels and optical black (OB) pixels;
   a comparator having a first input terminal at which a pixel signal of the pixel array is applied, and a second input terminal at which a ramp signal is applied;
   a digital-to-analog converter (DAC) configured to generate an OB voltage based on dark current data obtained by reading out pixel signals of the OB pixels; and
   a dark current removal circuit configured to apply a compensation voltage corresponding to the OB voltage to at least one of the first input terminal and the second input terminal during a readout period of an active pixel from among the active pixels,
   wherein the dark current removal circuit comprises
      a plurality of switches,
      a first capacitor having a first end at which the pixel signal is applied, and a second end connected to the first input terminal,
      a second capacitor having a third end at which the ramp signal is applied, and a fourth end connected to the second input terminal,
      a third capacitor configured to apply the compensation voltage to the first input terminal based on operation of the plurality of switches, and
      a fourth capacitor configured to apply the compensation voltage to the second input terminal based on operation of the plurality of switches.

2. The image sensor of claim 1, wherein the compensation voltage, applied to the first input terminal through the third capacitor, is a first compensation voltage increased by a magnitude of the OB voltage, and
   the compensation voltage, applied to the second input terminal through the fourth capacitor, is a second compensation voltage decreased by the magnitude of the OB voltage.

3. The image sensor of claim 2, wherein the plurality of switches comprise:
   a first switch having a fifth end connected to a ground voltage and a sixth another end connected to the third capacitor;

a second switch having a seventh end connected to the OB voltage and an eighth end connected to the third capacitor;

a third switch having a ninth end connected to the ground voltage and a tenth end connected to the fourth capacitor; and a fourth switch having an eleventh end connected to the OB voltage and a twelfth end connected to the fourth capacitor.

4. The image sensor of claim 3, wherein the first compensation voltage is generated by turning off the first switch and turning on the second switch, and the second compensation voltage is generated by turning on the third switch and turning off the fourth switch.

5. The image sensor of claim 2, wherein the dark current removal circuit is configured to apply the first compensation voltage to the first input terminal and apply a ground voltage to the fourth capacitor during the readout period of the active pixel.

6. The image sensor of claim 5, wherein a voltage at the second input terminal varies with a predetermined slope depending on the ramp signal after the first compensation voltage is applied to the first input terminal.

7. The image sensor of claim 2, wherein the dark current removal circuit is configured to apply the second compensation voltage to the second input terminal and apply a ground voltage to the third capacitor during the readout period of the active pixel.

8. The image sensor of claim 7, wherein a voltage at the second input terminal varies with a predetermined slope depending on the ramp signal after the second compensation voltage is applied to the second input terminal.

9. The image sensor of claim 2, wherein the dark current removal circuit is configured to apply the first compensation voltage to the first input terminal and apply the second compensation voltage to the second input terminal during the readout period of the active pixel.

10. The image sensor of claim 9, wherein a voltage at the second input terminal varies with a predetermined slope depending on the ramp signal after the first compensation voltage and the second compensation voltage are applied to the first input terminal and the second input terminal, respectively.

11. The image sensor of claim 1, wherein the plurality of switches comprise:

a first switch configured to connect the first capacitor and the third capacitor in parallel when the first switch is turned on; and a second switch configured to connect the second capacitor and the fourth capacitor in parallel when the second switch is turned on.

12. The image sensor of claim 11, wherein the dark current removal circuit is configured to operate in either one of a first mode in which the first switch and the second switch are turned on, and a second mode in which the first switch and the second switch are turned off, and apply a voltage corresponding to the OB voltage to at least one of the first input terminal and the second input terminal while operating in the second mode.

13. The image sensor of claim 12, wherein the dark current removal circuit is configured to apply the pixel signal to the first input terminal through the first capacitor and the third capacitor connected in parallel and apply the ramp signal to the second input terminal through the second capacitor and the fourth capacitor connected in parallel while operating in the first mode.

14. The image sensor of claim 12, comprising:

a switch controller configured to control turn-on and turn-off operations of the first switch and the second switch based on a temperature of the image sensor or the dark current data, wherein the switch controller turns off the first switch and the second switch when the temperature of the image sensor is higher than or equal to a predetermined temperature or when the dark current data is greater than or equal to a predetermined value.

15. The image sensor of claim 1, wherein capacitances of each of the first capacitor and the second capacitor have a first value, capacitances of each of the third capacitor and the fourth capacitor have a second value, and the first value is equal to the second value or greater than the second value.

16. The image sensor of claim 15, wherein the DAC is configured to generate a first OB voltage based on the dark current data when the first value is equal to the second value, and generate a second OB voltage, higher than the first OB voltage, based on the dark current data when the first value is greater than the second value.

17. The image sensor of claim 1, wherein the pixel array is read out in an order of the OB pixels and the active pixels during a single frame time, and the dark current data is a representative value of OB pixel values based on a result of reading out the OB pixels.

18. An image sensor comprising:

a pixel array comprising active pixels receiving light and optical black (OB) pixels shielded from light;

a plurality of comparators respectively provided for each column of the pixel array and configured to compare pixel signals of the pixel array that are input through a first input terminal with a ramp signal that is input through a second input terminal to output comparison signals;

a plurality of counters respectively provided for each column of the pixel array and configured to output count values based on the comparison signals;

an image signal processor (ISP) configured to generate dark current data using the count values based on pixel signals of the OB pixels;

a digital-to-analog converter (DAC) configured to generate an OB voltage corresponding to the dark current data; and a dark current removal circuit provided for each column of the pixel array and configured to reflect the OB voltage in at least one of the pixel signals of the active pixels input to the plurality of comparators and the ramp signal, wherein the dark current removal circuit comprises a plurality of switches, a first capacitor having a first end at which a pixel signal from among the pixel signals of the pixel array is applied, and a second end connected to the first input terminal, a second capacitor having a third end at which the ramp signal is applied, and a fourth end connected to the second input terminal, a third capacitor configured to apply a compensation voltage to the first input terminal based on operation of the plurality of switches, and a fourth capacitor configured to apply the compensation voltage to the second input terminal based on operation of the plurality of switches.

19. A method of operating an image sensor comprising active pixels receiving light and optical black (OB) pixels shielded from light, the method comprising:

obtaining dark current data by reading out pixel signals of the OB pixels;

generating an analog voltage corresponding to the dark current data; and removing a noise component, caused by dark current, from pixel signals of the active pixels using the analog voltage, wherein the image sensor comprises a comparator having a first input terminal at which a pixel signal from among the pixel signals of the active pixels is applied, and a second input terminal at which a ramp signal is applied, and the removing of the noise component comprises reflecting, by a dark current removal circuit, the analog voltage in at least one of the first input terminal and the second input terminal during a readout period of an active pixel, wherein the dark current removal circuit comprises a plurality of switches, a first capacitor having a first end at which the pixel signal is applied, and a second end connected to the first input terminal, a second capacitor having a third end at which the ramp signal is applied, and a fourth end connected to the second input terminal, a third capacitor configured to apply a compensation voltage to the first input terminal based on operation of the plurality of switches, and a fourth capacitor configured to apply the compensation voltage to the second input terminal based on operation of the plurality of switches.

* * * * *